United States Patent
Sturlaugson et al.

(10) Patent No.: US 10,472,096 B2
(45) Date of Patent: Nov. 12, 2019

(54) ADVANCED ANALYTIC METHODS AND SYSTEMS UTILIZING TRUST-WEIGHTED MACHINE LEARNING MODELS

(71) Applicant: The Boeing Company, Chicago, IL (US)

(72) Inventors: Liessman E. Sturlaugson, St. Louis, MO (US); James M. Ethington, St. Charles, MO (US)

(73) Assignee: The Boeing Company, Chicago, IL (US)

(*) Notice: Subject to any disclaimer, the term of this patent is extended or adjusted under 35 U.S.C. 154(b) by 181 days.

(21) Appl. No.: 15/608,693

(22) Filed: May 30, 2017

(65) Prior Publication Data
US 2018/0346151 A1 Dec. 6, 2018

(51) Int. Cl.
*B64F 5/60* (2017.01)
*G06N 20/20* (2019.01)
*G05B 23/02* (2006.01)
*G06N 20/00* (2019.01)
*G06F 16/00* (2019.01)

(52) U.S. Cl.
CPC ............ *B64F 5/60* (2017.01); *G05B 23/0254* (2013.01); *G06F 16/00* (2019.01); *G06N 20/00* (2019.01); *G06N 20/20* (2019.01)

(58) Field of Classification Search
CPC ....... B64F 5/60; G05B 23/0205; G06F 16/00; G06N 20/00; G06N 3/02
USPC .................................................... 701/1, 32.9
See application file for complete search history.

(56) References Cited

U.S. PATENT DOCUMENTS

| | | |
|---|---|---|
| 7,693,900 B2 | 4/2010 | Wilmering et al. |
| 7,953,506 B2 | 5/2011 | Tookey et al. |
| 8,165,968 B2 | 4/2012 | Ramesh et al. |
| 8,180,750 B2 | 5/2012 | Wilmering et al. |
| 8,296,252 B2 | 10/2012 | Bernard |

(Continued)

FOREIGN PATENT DOCUMENTS

WO    WO 01/95174    12/2001

OTHER PUBLICATIONS

Hall et al., The WEKA Data Mining Software: An Update, SIGKDD Explorations, vol. 11, Issue 1, pp. 10-18, 2009.

(Continued)

*Primary Examiner* — Jaime Figueroa
(74) *Attorney, Agent, or Firm* — Dascenzo Intellectual Property Law, P.C.

(57) ABSTRACT

Systems and methods of the present disclosure include determining a performance status of a selected component in an aircraft. An ensemble of related machine learning models is applied to feature data extracted from flight data of the aircraft. Each model produces a positive score and a complementary negative score related to performance of the selected component. The positive scores are weighted based on the false positive rates of the models and the negative scores are weighted based on the false negative rates of the models. The weighted positive scores are combined, e.g., by averaging, and the weighted negative scores are combined, e.g., by averaging. The performance status of the selected component is determined as one of a positive category, a negative category, or an unclassified category based on the values of the combined weighted positive scores and the combined weighted negative scores.

20 Claims, 5 Drawing Sheets

(56) References Cited

U.S. PATENT DOCUMENTS

| | | | |
|---|---|---|---|
| 8,370,280 | B1 | 2/2013 | Lin et al. |
| 8,494,824 | B2 | 7/2013 | Schmitz et al. |
| 8,955,365 | B2 | 2/2015 | do Amaral et al. |
| 9,037,320 | B1 | 5/2015 | Kesler et al. |
| 9,547,944 | B2 | 1/2017 | Nelson et al. |
| 9,617,010 | B2 | 4/2017 | Conrad |
| 2003/0102191 | A1* | 6/2003 | DeVlieg ............... B60T 8/1703 188/1.11 W |
| 2004/0093130 | A1 | 5/2004 | Osder et al. |
| 2008/0021604 | A1 | 1/2008 | Bouvier et al. |
| 2008/0154458 | A1 | 6/2008 | Brandstetter et al. |
| 2009/0055339 | A1 | 2/2009 | Bernard |
| 2010/0241596 | A1 | 9/2010 | Lee et al. |
| 2012/0221193 | A1 | 8/2012 | Delaye et al. |
| 2013/0145482 | A1* | 6/2013 | Ricci ..................... H04W 4/90 726/28 |
| 2013/0275059 | A1 | 10/2013 | Bernhard et al. |
| 2014/0201571 | A1* | 7/2014 | Hosek ................ G06F 11/2257 714/26 |
| 2015/0324501 | A1 | 11/2015 | Desell et al. |
| 2016/0217388 | A1* | 7/2016 | Okanohara ............ G06N 20/00 |
| 2016/0259873 | A1 | 9/2016 | Kessie et al. |
| 2016/0300156 | A1 | 10/2016 | Bowers et al. |
| 2017/0166328 | A1* | 6/2017 | Ethington ................ B64F 5/60 |
| 2017/0193372 | A1* | 7/2017 | Schimert .................. G06N 5/04 |
| 2017/0323274 | A1* | 11/2017 | Johnson ............... G05B 13/041 |
| 2017/0369190 | A1* | 12/2017 | Ethington ............ G07C 5/0816 |
| 2017/0372000 | A1* | 12/2017 | Ethington ........... G06F 17/5095 |
| 2017/1372000 | | 12/2017 | Ethington et al. |
| 2018/0025317 | A1* | 1/2018 | Dominguez ......... G06Q 30/018 705/332 |
| 2018/0102000 | A1* | 4/2018 | Vala ....................... B64D 45/00 |
| 2018/0136995 | A1 | 5/2018 | Sheppard et al. |
| 2018/0268288 | A1* | 9/2018 | Vandike ................ F01D 21/003 |

OTHER PUBLICATIONS

U.S. Appl. No. 14/966,931, filed Dec. 11, 2015, Ethington et al.
U.S. Appl. No. 14/966,372, filed Dec. 11, 2015, Ethington et al.
U.S. Appl. No. 14/730,655, filed Jun. 4, 2015, Sturlaugson et al.
C. Merkwirth et al., "A Short Introduction to ENTOOL," Jan. 14, 2003, pp. 1-11. Downloaded from j-wichard.de/entool/ on Mar. 14, 2017.
"Compare Multi-Class Classifiers: Letter Recognition," Microsoft Cortana Intelligence Gallery, Sep. 2, 2014, downloaded from gallery.cortanaintelligence.com/Experiment/Compare-Multi-class-Classifiers-Letter-recognition-2 on Jun. 24, 2016.
G. Ericson, "Walkthrough Step 4: Train and Evaluate the Predictive Analytic Models," Microsoft, Apr. 22, 2015, downloaded from azure.microsoft.com/en-us/documentation/articles/machine-learning-walkthrough-4-train-and-evaluate-models on May 4, 2015.
"Model Training and Tuning," Dec. 31, 2014, downloaded from topepo.github.io/caret/training on May 4, 2015.
"The caret Package," Dec. 31, 2014, downloaded from topepo.github.io/caret/index on May 4, 2015.
R. Caruana et al., "Ensemble Selection from Libraries of Models," Proceedings of the 21$^{st}$ International Conference on Machine Learning, Banff, Canada, Jul. 4-8, 2004.
F. Provost et al., "Robust Classification for Imprecise Environments," Machine Learning, 42, pp. 203-231, 2001.
Kählert, "Specification and Evaluation of Prediction Concepts in Aircraft Maintenance," Dissertation D17, Technische Universität Darmstadt, Apr. 4, 2017.
Wei, "Prediction of the Aircraft Fault Maintenance Sorties Based on Least Squares of Linear Regression," 2012 3rd International Conference on System Science, Engineering Design and Manufacturing Informatization, pp. 223-225, Oct. 20, 2012.
Ghobbar, A. et al., Evaluation of forecasting methods for intermittent parts demand in the field of aviation: a predictive model, ScienceDirect Elsevier Computers & Research, vol. 30, Issue 14, Dec. 2003, pp. 2097-2114, Dec. 2003.
Byington, C. et al., Data-driven neural network methodology to remaining life predictions for aircraft actuator components, 2004 IEEE Aerospace Conference Proceedings (IEEE Cat. No. 04TH8720), pp. 3581-3589, 2004.
Yan, W., Application of Random Forest to Aircraft Engine Fault Diagnosis, IMACS Multiconference on "Computational Engineering in Systems Applications" (CESA), vol. 1, pp. 468-475, Oct. 4-6, 2006.
Lienhardt, B. et al., Design Forum Failure-Finding Frequency for a Repairable System Subject to Hidden Failures, Journal of Aircraft, vol. 45, No. 5, pp. 1804-1809, Sep.-Oct. 2008.
Soares, S. et al., Comparison of a genetic algorithm and simulated annealing for automatic neural network ensemble development, Neurocomputing, vol. 121, pp. 498-511, Jun. 11, 2013.
Shevach, G. et al., Towards Performance Prognostics of a Launch Valve, Annual Conference of the Prognostics and Health Management Society 2014, pp. 62-69, 2014.

\* cited by examiner

ADVANCED ANALYTIC METHODS AND SYSTEMS UTILIZING TRUST-WEIGHTED MACHINE LEARNING MODELS

FIELD

The present disclosure relates to advanced analytic methods and systems utilizing trust-weighted machine learning models.

BACKGROUND

Aircraft and other complex apparatuses include a myriad of interoperating components. Many subsystems of components are designed for maintenance and/or repair. When such a subsystem or component performs unexpectedly (e.g., it becomes non-responsive or functions with degraded performance), the operation of the aircraft may be impacted and the aircraft may be subject to unscheduled maintenance and down time. As an example, servomechanisms operating flight control surfaces of aircraft may become non-operational and may consequently result in strain on the flight control system, fuel waste, aircraft down time, excess troubleshooting, strain on the replacement part supply, and/or potential stress on other aircraft components and systems. The consequences of an unexpected need to repair or an unexpected repair of the non-performing component may be much greater than the cost, in time and resources, to repair or replace the non-performing component.

For many components, operators currently have no insight into the health of the components. Moreover, subsystems and components may behave erratically and unexpectedly well before complete non-performance. The behavior of components that may lead to non-performance may manifest as merely non-specific system degradation and related effects.

Aircraft may be available for maintenance and diagnosis only between flights. If a component performs unexpectedly during a flight, the non-performing component may require an abrupt end to the flight, necessitating a return trip for repair or at least temporary abandonment of the aircraft.

If a component does not pass pre-flight tests, the component may need to be repaired or replaced before the next flight. After a component has performed unexpectedly during a flight and resulted in noticeable system performance degradation, maintenance staff may troubleshoot the aircraft function and eventually identify the non-performing part as a contributor to the observed system performance degradation. The unscheduled down time and maintenance to identify the issue and to repair or replace the non-performing component may lead to resource conflicts with the aircraft. The aircraft typically is unavailable for use during troubleshooting and repair. Additionally, the unscheduled down time and maintenance may lead to strains on the scheduling of maintenance personnel due to excess time troubleshooting and identifying the issue, and may lead to strains on the supply chain for replacement parts because the need for parts may not be predictable. This reactive response to non-performing components may be inefficient when compared to scheduled maintenance or a proactive response to impending component non-performance.

Further, aircraft may include components designed to last the service life of the aircraft and not specifically designed for maintenance and/or repair. For example, airframe components generally are expected to function for the service life of the aircraft. However, some components may not react to the stresses of use and the environment as expected and some aircraft may be used beyond the originally designed service life. In such cases, repair or replacement of structural components not originally designed to be repaired or replaced may cause significant downtime for individual aircraft while the affected structural components are repaired or reproduced for replacement.

For example, the F/A-18 Hornet model of aircraft was first placed into operational service in 1983. Now more than 30 years later, the majority of F/A-18 Hornet aircraft in service are operated at or beyond their originally designed service life (6,000-8,000 hours). Continued operation relies on a structured approach to inspection, maintenance, and repair that includes airframe repair and replacement. Airframe inspection, repair, and replacement are performed during cycles of heavy maintenance. During heavy maintenance, the airframe and other structural components are inspected for mechanical wear, heat damage, corrosion, and other signs of component fatigue. Though heavy maintenance commonly results in repair or replacement of some structural components, predicting which components will need repair or replacement in a particular aircraft is very difficult with current technology. Hence, maintaining the F/A-18 Hornet fleet in serviceable condition leads to new and variable demand for a large number of airframe and other structural components that were not originally designed to be repaired or replaced. Additionally, heavy maintenance results in unpredictable downtime for individual aircraft due to the variable demand for repaired or replacement components and the time to repair, reproduce, and/or replace the affected components.

SUMMARY

Systems and methods of the present disclosure include determining a performance status of a selected component in an aircraft. Flight data may be collected during a flight of the aircraft. Feature data is extracted from the flight data. The feature data relates to performance of one or more components of the aircraft. An ensemble of related machine learning models is applied to the feature data. Each model is characterized by a false positive rate and a false negative rate, and generally by a ROC (receiver operating characteristic).

Each model produces a positive score and a complementary negative score related to performance of the selected component. The positive score of each model is weighted based on the false positive rate of the model such that the weighted positive score is anti-correlated with the false positive rate. The weighted positive scores of the models of the ensemble are combined, e.g., by summation, averaging, etc., to produce a combined weighted positive score. The negative score of each model is weighted based on the false negative weight of the model such that the weighted negative score is anti-correlated with the false negative rate. The weighted negative scores of the models of the ensemble are combined, e.g., by summation, averaging, etc., to produce a combined weighted negative score.

The performance status of the selected component is determined as one of a positive category, a negative category, or an unclassified category. The positive category is determined if the combined weighted positive score is greater than a threshold value and the combined weighted negative score is less than or equal to the threshold value. The negative category is determined if the combined weighted positive score is less than or equal to the threshold value and the combined weighted negative score is greater than the threshold value. The unclassified category is determined otherwise, i.e., if both of the combined weighted positive score and the combined weighted negative score are greater than the threshold value or both are less than or equal to the threshold value.

DESCRIPTION

Figure 1:
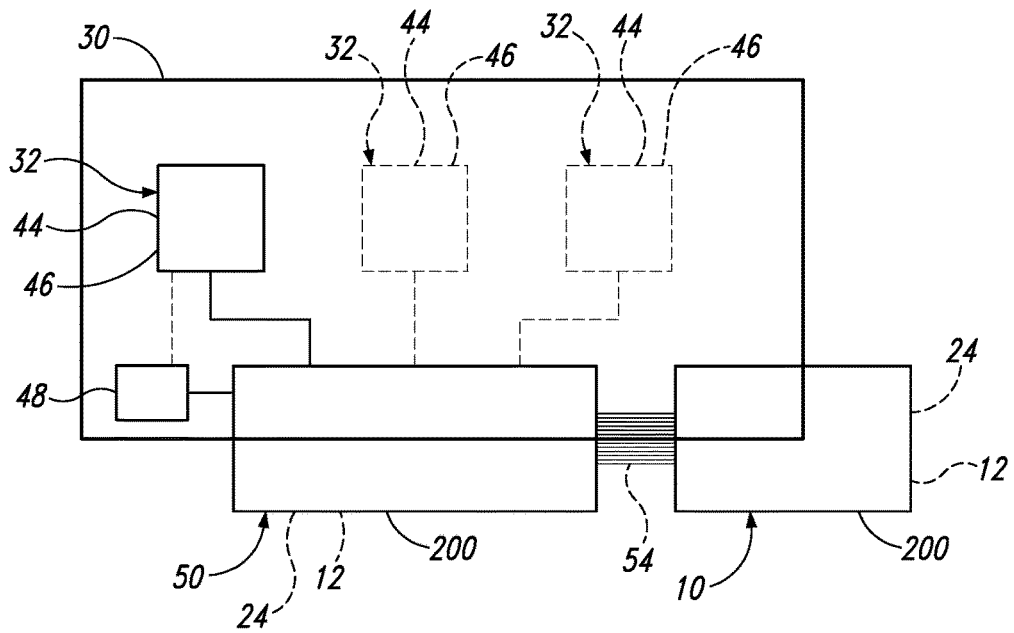
FIG. 1 is a schematic representation of an aircraft and associated predictive maintenance system.

Conventional approaches to servicing components that are not performing to specifications or that are at risk of non-performance include proactive replacement at scheduled maintenance intervals (regardless of performance status) and testing (before, during, and/or after use). For example, many aircraft include built-in self-tests for individual components that are performed before flight. Additionally or alternatively, the performance of a component may be monitored in use (e.g., as an active component is actuated). If the test indicates the component is performing unexpectedly, the operator (e.g., aircrew) and/or service personnel are notified of the need for repair or replacement. Generally, this type of testing provides only present, and possibly past, indications of component performance and no indication of future performance, such as impending non-performance. Proactive replacement during scheduled maintenance replaces components based upon an estimate of the useful life of the population of components and does not rely on a prediction of when a particular component needs replacement.

However, the history of operation of the aircraft and/or the individual components provides insight into when a component may experience a non-performance event. Hence, the operational history and/or the operational characteristics of the component may be utilized to reliably schedule component maintenance prior to any unexpected performance. As used herein, non-performing and non-performance include unexpected performance, degraded performance, and/or non-responsiveness. Non-performing and non-performance may include partial operation (e.g., when a component performs expectedly in some situations but not others, or when a component provides a functional but inadequate response) and complete non-operation (e.g., when a component does not respond to commands or other input, or when a component provides an unacceptable response).

As an example, aircraft may monitor their subsystems and overall performance, and record system operation data, which may relate to active and/or structural component health. For example, aircraft may record speed, acceleration, flight time, number of take-offs and landings, number of catapults, number of traps, etc. (and/or such data may be recorded for individual aircraft). Some aircraft, such as F/A-18 Hornet model aircraft, include accelerometers and/or strain gauges to measure overall aircraft motion and stresses applied to components and/or sections of the aircraft. However, simple measures such as total flight hours, total number of traps, or peak acceleration do not reliably predict when or which components should be replaced.

For complex problems like predicting performance of aircraft components, machine learning algorithms may provide efficient solutions. However, even when guided and assisted by data scientists, many machine learning algorithms may result in models that are class biased, i.e., significantly better at predicting one outcome (class) over another. Models that have asymmetric prediction performance are referred to as class-biased models. A class-biased model may have a low error rate for a single class, such as a 'positive' prediction, while having a high error for a different class (or the other class in a two-class system). For example, a class-biased model may identify aircraft components in need of service with great accuracy (e.g., a high true positive rate) but may also identify nearly all of the same type of components as in need of service (whether service is actually needed or not). Because such a class-biased model has a high error rate (e.g., a high false positive rate and a low true negative rate), the class-biased model does not sufficiently discriminate components (as needing service or not).

Systems and methods of the present disclosure may leverage the power of class-biased models (e.g., having a low false negative rate) while limiting the effect of the overall error of the class-biased models. The disclosed systems and methods utilize a group of models in an ensemble to leverage the strengths of all of the models to produce an aggregate result that is more accurate than the underlying models and that does not suffer from the errors associated with class-biased models. Hence, systems and methods of the present disclosure do not need to rely on a single model that has high accuracy (e.g., both high true positive and high true negative rates).

In the systems and methods of the present disclosure, each of the models of the ensemble is utilized to independently assess the input data. The independent assessments are aggregated by weighting the independent assessments according to the estimated performance of the respective model (hence, weighting based on the trustworthiness or reliability of the individual models' prediction). Thus, unlike conventional weighting in which the weights are based on the number of models or consensus among models, the systems and methods of the present disclosure create and/or apply weights that emphasize accurate models for a particular outcome (class-biased models) when those models are likely to accurately assess the outcome.

For example, a given problem to assess component performance (e.g., in need of repair or not) may yield five useful models: one relatively good at identifying when repair is needed but also with a high false positive rate, one relatively good at identifying when a repair is not needed but also with a high false negative rate, and three with in-between true positive and false positive rates. The model that has a high false positive rate is weighted lower when it produces a positive case result. The model that has a high false negative rate is weighted lower when it produces a negative case result. More generally, each of the models is weighted according to the false positive rate and false negative rate (and/or other measures of model performance and/or class bias) and according to the result of the respective model.

FIGS. 1-7 illustrate various aspects of predictive maintenance systems and methods according to the present disclosure. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labelled with numbers consistent among the figures. Like numbers in each of the figures, and the corresponding elements, may not be discussed in detail herein with reference to each of the figures. Similarly, all elements may not be labelled or shown in each of the figures, but reference numerals associated therewith may be used for consistency. Elements, components, and/or features that are discussed with reference to one or more of the figures may be included in and/or used with any of the figures without departing from the scope of the present disclosure.

Figure 7:
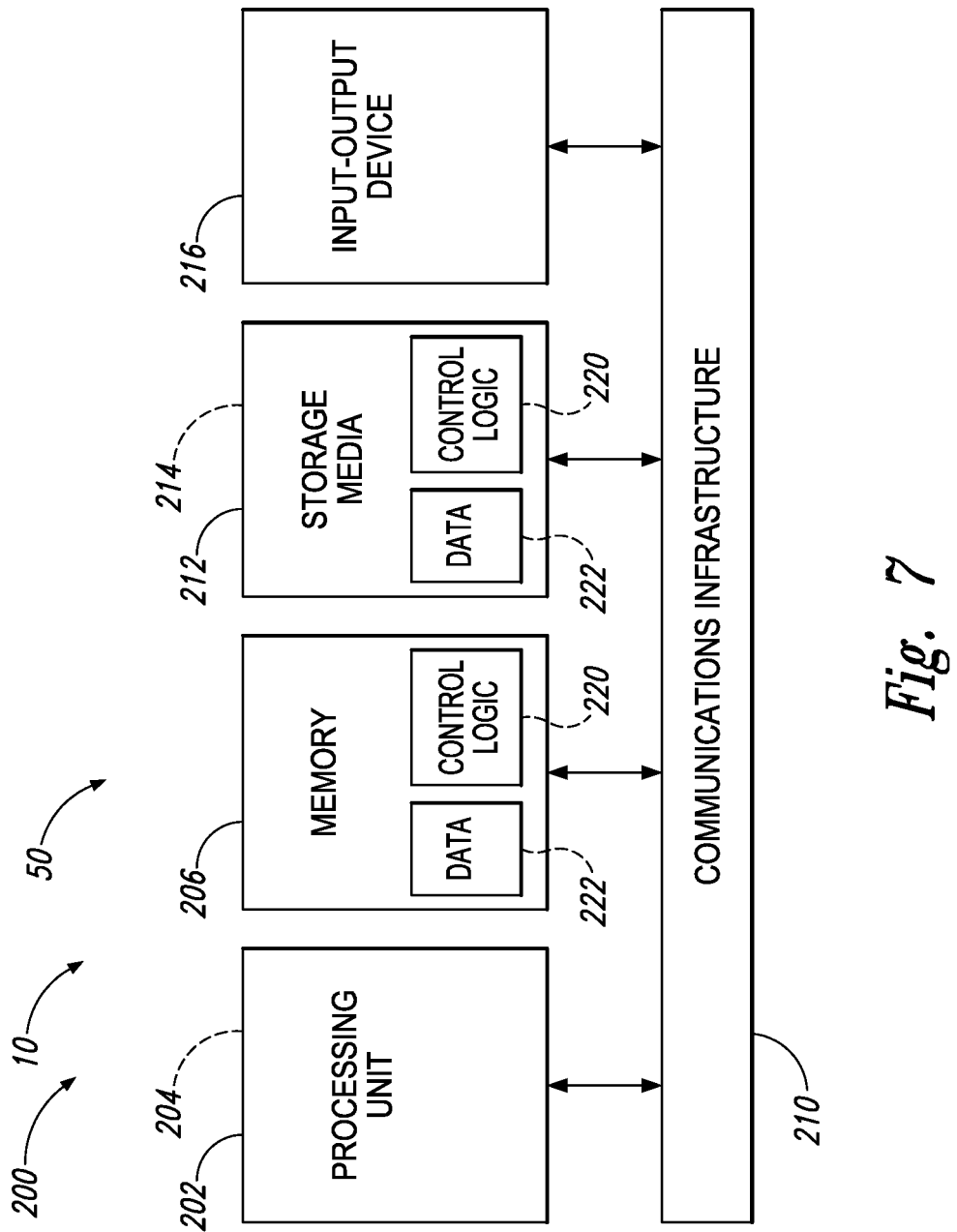
FIG. 7 is a schematic representation of a computerized system.

As illustrated in FIG. 1, a predictive maintenance system 10 includes a computerized system 200 (as further discussed with respect to FIG. 7). The predictive maintenance system 10 may be programmed to perform, and/or may store instructions to perform, the methods described herein.

The predictive maintenance system 10 is associated with an aircraft 30. The predictive maintenance system 10 may be an independent system and/or may be a part of the aircraft 30 (an on-board system, also referred to as an on-platform system), as schematically represented by the overlapping boxes of aircraft 30 and predictive maintenance system 10 in FIG. 1. In particular, where the predictive maintenance system 10 is physically independent of the aircraft 30, the predictive maintenance system 10 may be associated with a plurality of aircraft 30 (e.g., a fleet of aircraft 30).

Figure 2:
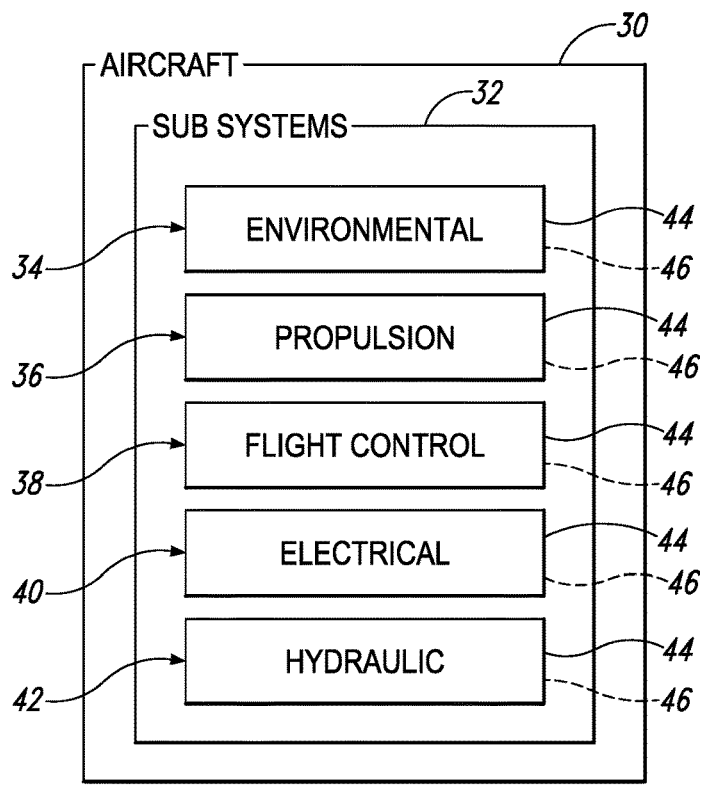
FIG. 2 is a schematic representation of an aircraft with subsystems of the aircraft.

Aircraft 30 are vehicles configured for flight and include one or more subsystems 32 that control, perform, and/or monitor one or more aspects of aircraft operation. As indicated in FIG. 2, examples of subsystems 32, which also may be referred to as systems, include an environmental control system 34, a propulsion system 36, a flight control system 38, an electrical system 40, and a hydraulic system 42. Subsystems 32 may be a portion of other systems or subsystems of aircraft 30. For example, subsystem 32 may be a rudder control system that is a subsystem of the flight control system 38. Subsystems 32 include one or more components 44 that together may perform the function of the subsystem 32. Examples of components 44 include an actuator, a servomechanism, an engine, a motor, an electronics module, a pump, a valve, and an airframe member. Components 44 may be referred to as parts, elements, units, etc., and may be line replaceable and/or field replaceable (e.g., line replaceable units). Components 44 may be subsystems of the respective subsystem 32. Components 44 may be active and/or controlled components, e.g., components 44 may be configured to change state during flight of the aircraft 30. Components 44 may be electrical, optical, mechanical, hydraulic, fluidic, pneumatic, structural, and/or aerodynamic components.

If a component 44 performs unexpectedly, or otherwise is non-performing, the operation of the corresponding subsystem 32 may be impacted. Many aircraft 30 are designed to be tolerant of component non-performance. For example, aircraft 30 may include redundant subsystems 32 and/or subsystems 32 may incorporate redundant components 44. Additionally or alternatively, subsystems 32 may be designed to safely operate with less than all components 44 fully operational, e.g., by operating with reduced performance.

As shown generally in FIGS. 1 and 2, subsystems 32 generally include sensors 46 configured to measure and/or monitor the performance of individual components 44, groups of components 44, and/or the subsystem 32. Additionally or alternatively, sensors 46 may measure and/or monitor the environmental condition, the condition of one or more components 44, and/or the inputs and/or outputs of the subsystem 32 and/or the component(s) 44. Sensors 46 may be utilized in built-in testing, performance monitoring, and/or subsystem control. Sensors 46 may be and/or may include encoders, accelerometers, position sensors, electrical meters, electronic compasses, strain gauges, temperature sensors, and/or pressure transducers.

Further, aircraft 30 may include a controller 50 that may be configured to control and/or monitor one or more subsystems 32, components 44, and/or sensors 46. Controller 50 may be on board the aircraft 30 (also referred to as on-platform), may be operated independent of the aircraft 30, and may be a system independent of the aircraft 30 (also referred to as off-platform), as schematically represented by the overlapping boxes of aircraft 30 and controller 50 in FIG. 1. Controller 50 and predictive maintenance system 10 may communicate via a data link 54. The data link 54 is an electronic communication link and may include one or more wired, wireless, radio, optical, and/or electrical communication channels.

Generally, sensors 46 and/or controllers 50 are configured to collect data during flight of the aircraft 30. The data collected from the sensors 46 are flight data 24. Data may include records of environmental conditions (e.g., temperature, pressure, humidity), aircraft operation (e.g., airspeed, altitude, ground location, heading), flight performance (e.g., acceleration (in a direction and/or about an axis), vertical acceleration, strain, velocity (in a direction and/or about an axis), vertical velocity, pitch rate, roll rate, yaw rate, angle of attack, attitude, etc.), subsystem operation (actual operation), subsystem command status (expected operation), component operation (actual operation), and/or component command status (expected operation). Controller 50 may be configured to store flight data 24, e.g., in a flight database 12, and may be referred to as a flight data storage system. The flight database 12 may be at least partially stored in the controller 50 and/or the predictive maintenance system 10. The flight database 12 may include flight data 24 from more than one flight of the aircraft 30 and may include flight data 24 from a plurality of aircraft 30 (e.g., a fleet of aircraft 30).

Actively-controlled components 44 may be controlled by signals from the controller 50 and/or a control input 48, optionally in one or more feedback loops. Control inputs 48 are configured to accept operator (e.g., aircrew) inputs and to provide the operator inputs to the controller 50 and/or the component 44. Operator inputs may be a position, a force, a pressure, and/or an angle applied to the control input 48. Examples of control inputs 48 include a control stick (also called a yoke), an engine throttle lever, a trim switch, rudder pedals, and a flap control switch.

Generally, actively-controlled components 44 may be part of a feedback loop in which a control signal from the controller 50 and/or the control input 48 commands the component 44 to react (e.g., move to a position) and in which one or more sensors 46 generate a response signal that indicates the result of the command (e.g., a position achieved in response to the command to move). The controller 50 may process the response signal to generate a new (or modified) control signal to reduce the error between the intent of the command and the result of the command.

Components 44 that are active may be controlled based on static or dynamic set points, user inputs, and/or the state of other components 44, the subsystem 32 that includes the component 44, other subsystems 32, and/or the aircraft 30 (e.g., flight performance parameters such as acceleration (in a direction and/or about an axis), vertical acceleration, velocity (in a direction and/or about an axis), vertical velocity, pitch rate, roll rate, yaw rate, angle of attack, attitude, etc.).

Feedback loops, where present, may incorporate feedback and control signals from one or more control inputs 48, one or more sensors 46, and/or settings of one or more other feedback loops. A feedback loop for one active component 44 generally incorporates signals from its associated control input(s) 48 and sensor(s) 46. The feedback loop may incorporate signals from control inputs 48 for other components 44, sensors 46 associated with other components 44, and/or other sensors 46 (supplied directly or indirectly through other controllers 50 or flight computers).

The predictive maintenance system 10 may include a display that is configured to present visual, audio, and/or tactile signals to an operator and/or user of the predictive maintenance system 10. The signals may be configured to indicate system information, for example, indicating the identity of the selected component 44, a performance status and/or performance category (e.g., operational, good, degraded performance, non-performing, impending non-performance, and/or maintenance needed), that the selected component 44 is likely to non-perform (or likely to perform), and/or the predicted remaining useful life of the selected component 44 (e.g., the number of flights before predicted non-performance). As further described with respect to FIG. 7, predictive maintenance system 10 and/or controller 50 may include, and/or may be, a computerized system 200.

Where it is hard to predict when a component 44 may perform unexpectedly, the urgency to repair a non-performing component may be heightened (e.g., to avoid having a subsystem 32 with more than one non-performing component). Further, unexpected performance of some components 44 may stress the respective subsystem 32 and may contribute to and/or cause other components 44 to perform unexpectedly. Hence, the non-performing component 44 typically is immediately repaired when non-performance is identified. The urgent repair may result in aborted flights and/or unscheduled maintenance of the aircraft, with the consequent unscheduled downtime, and may strain the supply chain for replacement parts. Unscheduled repair and downtime may lead to a lower availability of the aircraft 30 and/or the lack of availability of the aircraft 30 at critical moments in time. As used herein, repair and replacement of a component include installation of a different component (generally new or remanufactured) or repair of the original component.

Though examples may refer to aircraft 30, the systems and methods of this disclosure may be utilized with other apparatuses. For example, systems and methods of the present disclosure may be applied to other vehicles and/or machinery. Hence, a reference to aircraft 30 may be replaced with a reference to a vehicle and/or machinery. Corresponding terms like flight may be replaced by terms like excursion and/or operation; flying may be replaced by driving, operating, and/or running.

As used herein, the term 'fleet' refers to one or more of the subject aircraft, vehicles, and/or machinery. A fleet may refer to all of the subject aircraft, vehicles and/or machinery at a location, based at a location, used for a similar purpose, and/or used by a corporate entity (e.g., a corporation, a military unit). For a fleet of aircraft, each aircraft 30 may be substantially identical with the same types of subsystems 32 and the same types of components 44 in the subsystems 32. As used herein, components 44 of the same type are components 44 in equivalent locations, serving equivalent functions in the different aircraft 30 and/or subsystems 32.

Figure 3:
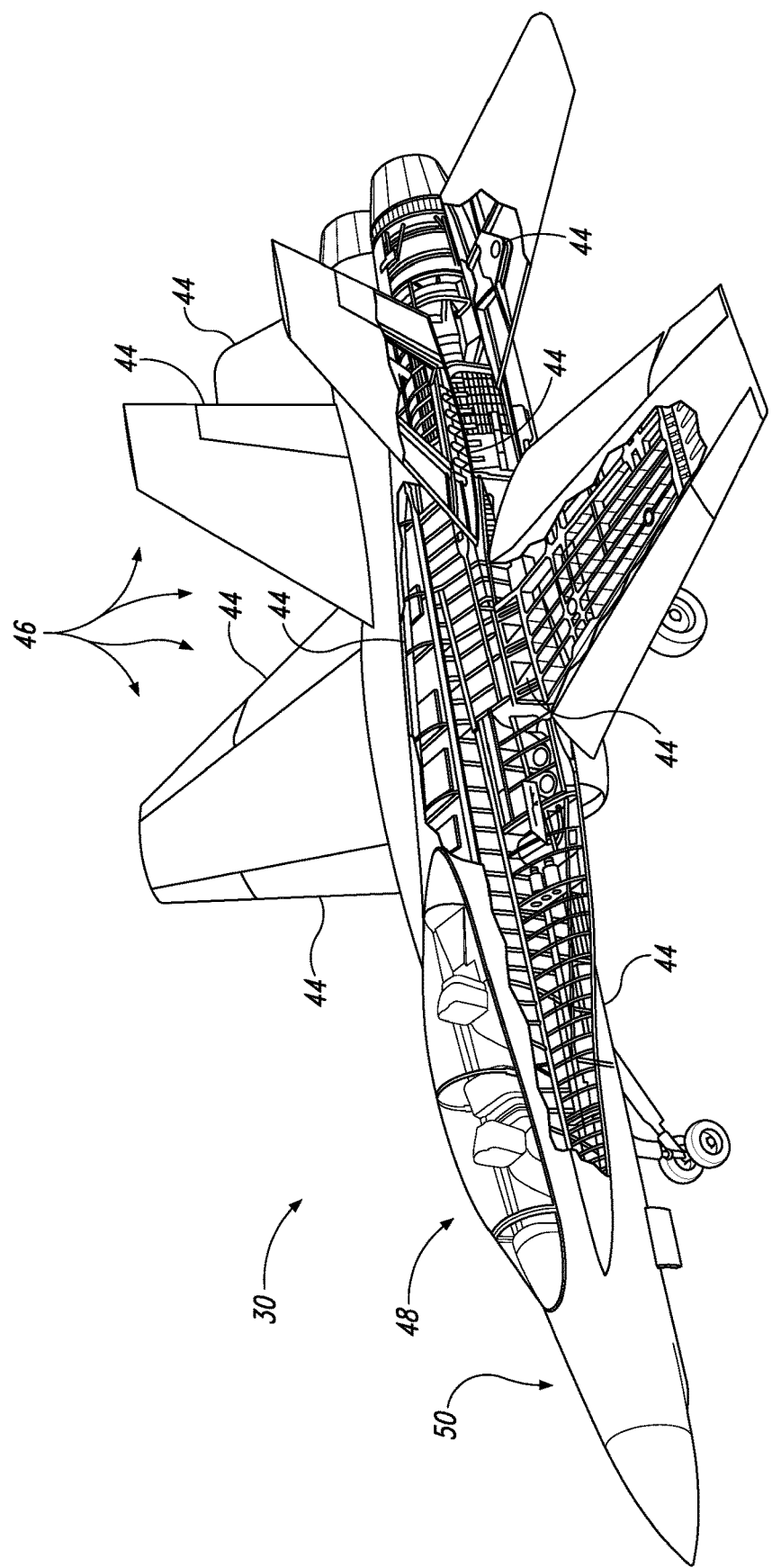
FIG. 3 is a schematic illustration of an example of an aircraft.

FIG. 3 illustrates an example of the aircraft 30 with various components 44 that may be the subject of the systems and methods of the present disclosure. As illustrated in the example of FIG. 3, components 44 generally are internal components such as actuators, servomechanisms, valves, airframe members, etc. Components 44 may be and/or may be associated with external portions of the aircraft 30 such as flight control surfaces, landing gear, etc.

The aircraft 30 may include various sensors 46 that may be associated (directly or indirectly) with a given component 44. Sensors 46 may be configured to measure environmental conditions (e.g., temperature, pressure, humidity), aircraft operation (e.g., airspeed, altitude, ground location, heading), flight performance (e.g., acceleration (in a direction and/or about an axis), vertical acceleration, strain, velocity (in a direction and/or about an axis), vertical velocity, pitch rate, roll rate, yaw rate, angle of attack, attitude, etc.), subsystem operation (actual operation), subsystem command status (expected operation), component operation (actual operation), and/or component command status (expected operation).

The aircraft 30 includes one or more control inputs 48 to provide control of the aircraft 30 and components 44 of the aircraft 30. The control inputs 48 typically are located in the cockpit and/or are accessible by the aircrew.

Figure 4:
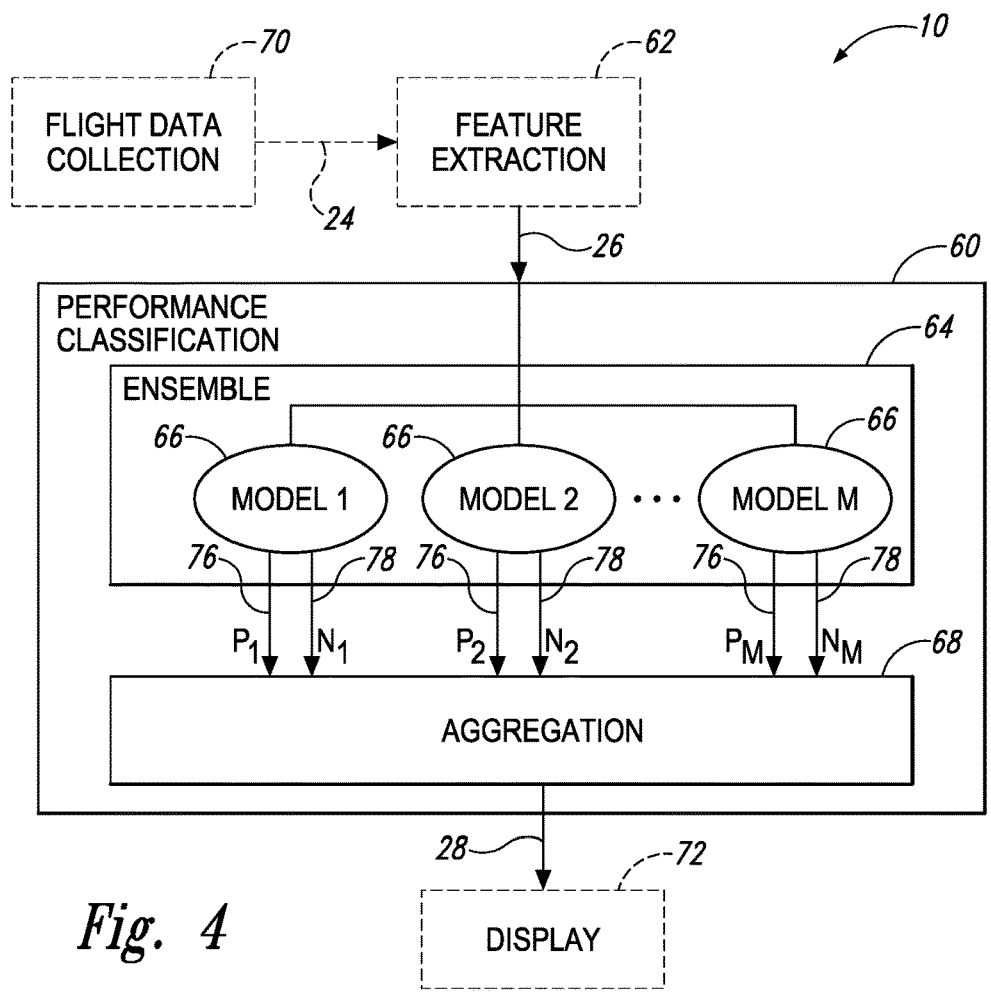
FIG. 4 is a schematic representation of a predictive maintenance system.

FIG. 4 is a schematic representation of a predictive maintenance system 10. The predictive maintenance system 10 is configured to utilize feature data 26 extracted from flight data 24 to produce a performance indicator 28 that reflects the performance status of the component 44 (e.g., current condition or the condition within a given number of future flights). For example, the performance indicator 28 may be the future performance likelihood, the likelihood of non-performance, whether non-performance is imminent or not, or whether the component 44 is performing as expected or not. The predictive maintenance system 10 may be configured to utilize flight data 24 along with feature data 26 to produce the performance indicator 28.

The performance indicator 28 also may be referred to as the category, prediction, and/or estimate of performance of the component 44 during future flights (e.g., an estimate of the likelihood of non-performance also may be referred to as a prediction of future non-performance). The flight data 24 and/or extracted feature data 26 may relate to the component 44 directly or may relate to the associated subsystem 32 and/or aircraft 30. The component 44 that is the subject of the predictive maintenance system 10 may be referred to as the subject component and/or the selected component.

The predictive maintenance system 10 may be part of a health management system and/or a health assessment system for the associated aircraft 30 (on-platform or off-platform). Additionally or alternatively, the predictive maintenance system 10 may be utilized to create and/or deploy predictive models for a health management system and/or a health assessment system. The health management system and/or the health assessment system may be configured to monitor, assess, and/or indicate the operational status of one or more components 44 of the aircraft 30.

As schematically represented in FIG. 4, the predictive maintenance system 10 includes several modules (e.g., instructions and/or data configured to be executed by a computerized system as described with respect to FIG. 7). These modules may be referred to as agents, programs, processes, and/or procedures.

The predictive maintenance system 10 includes a performance classification module 60. The performance classification module 60 includes an ensemble 64 of related primary models 66 and an aggregation module 68. The performance classification module 60 is configured to classify extracted feature data 26, i.e., to utilize feature data 26 extracted from flight data 24 to form the performance indicator 28 of the performance status of the component 44 (e.g., the future performance, the likelihood of non-performance, whether a non-performance event is imminent or not, whether the component 44 is performing as expected or not). The performance classification module 60 may be configured to utilize flight data 24 along with feature data 26 to produce the performance indicator 28. The predictive maintenance system 10 and/or the performance classification module 60 may provide a remaining useful life (RUL) estimate of the number of flights before actual non-performance is expected to occur.

Each of the primary models 66 (also referred to as models and machine learning models) of the ensemble 64 are machine learning algorithms that identify (e.g., classify) the category (one of at least two states) to which a new observation (set of extracted features) belongs. As used herein, the adjective "primary," when modifying model, classifier, category, and related elements, indicates a principal, base, fundamental, and/or limited element. Hence, the primary models 66 of the ensemble 64 form a basis for the performance classification module 60 to produce the performance indicator 28.

Primary models 66 are selected and/or configured to transform extracted feature data 26 into an estimate of performance status by producing a positive classification score 76. The positive classification score 76, which may be referred to as the positive score, is a numeric value that relates to the positive outcome or result of the primary model 66. Primary models 66 also produce a negative classification score 78 that is complementary to the positive classification score 76. The negative classification score 78, which may be referred to as a negative score, is a numeric value that relates to the negative outcome or result of the primary model 66.

The negative classification score 78 and the positive classification 76 score are complementary in that, for a two-class classification system, the combination of the negative classification score 78 and the positive classification score 76 encompass the entire range of possible outcomes for the primary model 66 (e.g., the performance status). For example, the positive classification score 76 and the negative classification score 78 may be likelihood estimates of respective positive and negative outcomes, and the positive classification score 76 and the negative classification score 78 may sum to unity (100%). Because the positive classification score 76 and the negative classification score 78 are complementary, one of the classification scores may be derived from the other. In some embodiments, the primary model 66 directly produces only one of the positive classification score 76 and the negative classification score 78. The other classification score may be derived from the classification score produced by the primary model 66.

The classification scores may be binary outcomes (e.g., performance acceptable or non-performance expected), likelihoods of non-performance or expected performance, etc. that reflect the performance status of the component 44 (e.g., current performance or expected performance for the given number of future flights). For example, the positive classification score 76 may be an estimate of the likelihood of the selected component's non-performance or need of repair and the negative classification score 78 may be an estimate of the likelihood of the selected component's performance or need of repair.

Primary models 66 of the ensemble 64 are related in that each of the primary models 66 relate to the same component 44 and to the same type of positive and negative classes (e.g., the same performance status). However, the primary models 66 are different machine learning models (e.g., using different algorithms or different parameters). The ensemble 64 may include two or more primary models 66. The positive and negative classes may be likelihoods of non-performance and expected performance, likelihoods of a non-performance event or no non-performance event, etc. Classes relating to continued performance may be referred to as "no impending non-performance," "no impending non-performance event," "no maintenance needed," "good," and/or "low risk." Classes relating to non-performance may be referred to as "impending non-performance," "impending non-performance event," "maintenance needed," and/or "high risk."

The terms positive and negative with respect to primary model 66 outcomes, predictions, scores, classes, cases, and/or performance refer to complementary states associated with the primary models 66 and do not generally refer to beneficial or detrimental states of the primary model 66 and/or the selected component 44. In a two-class classification system, positive refers to one of the classes and negative refers to the other class. Generally, primary models 66 relate to two classes (e.g., positive-negative, true-false, yes-no, binary values, etc.). Primary models 66 that relate to more than two classes may be mapped to one or more models that relate to two classes. For example, three classes, e.g., A, B, and C, may be mapped to three different two-class classifications, i.e., A or not A, B or not B, and C or not C.

Each primary model 66 may be characterized by performance with training or verification inputs (e.g., using inputs with known results). The model outcomes may be categorized as true positive outcomes (the predicted value of the model is positive and the known result is also positive), true negative outcomes (the predicted value is negative and the known result is negative), false positive outcomes (the predicted value is positive and the known result is negative), or false negative outcomes (the predicted value is negative and the known result is positive). True positives and true negatives are correct predictions of the primary model 66. False positives and false negatives are incorrect predictions of the primary model 66. A false positive is also called a type I error. A false negative is also called a type II error.

True positive rate, also called the sensitivity and/or the recall, is the total number of true positives divided by the total number of known positive results. Positive predictive value, also called the precision, is the total number of true positives divided by the total number of predicted positive values. True negative rate, also called the specificity, is the total number of true negatives divided by the total number of known negative results. Negative predictive value is the total number of true negatives divided by the total number of predicted negative values. False positive rate, also called the fall-out, is the total number of false positives divided by the total number of known negative results. False discovery rate is the total number of false positives divided by the total number of predicted positive values. False negative rate is the total number of false negatives divided by the total number of known positive results. False omission rate is the total number of false negatives divided by the total number of predicted negative values. Accuracy is the total number of true positives and true negatives divided by the total population. Unless more than two states are possible, the true positive rate is the complement of the false negative rate (i.e., the true positive rate and the false negative rate add to unity) and the true negative rate is the complement of the false positive rate (i.e., the true negative rate and the false positive rate add to unity).

Each primary model 66 may be characterized by its performance, for example by a true positive rate, a false positive rate, a true negative rate, and/or a false negative rate. The performance may be characterized by a performance metric that incorporates a cost component and a benefit component that relate to the performance of the primary model 66. For example, the primary models 66 may each be characterized by a receiver operating characteristic (ROC), which is an order pair of the false positive rate (cost) and the true positive rate (benefit). Other types of cost and benefit measures (e.g., false negative rate, true negative rate, positive predictive value, negative predictive value, false discovery rate, false omission rate, and/or accuracy) may be utilized in a similar manner. Generally, the primary models 66 of the ensemble 64 have different performance characteristics. Each of the primary models 66 may have a unique performance (e.g., ROC).

Figure 5:
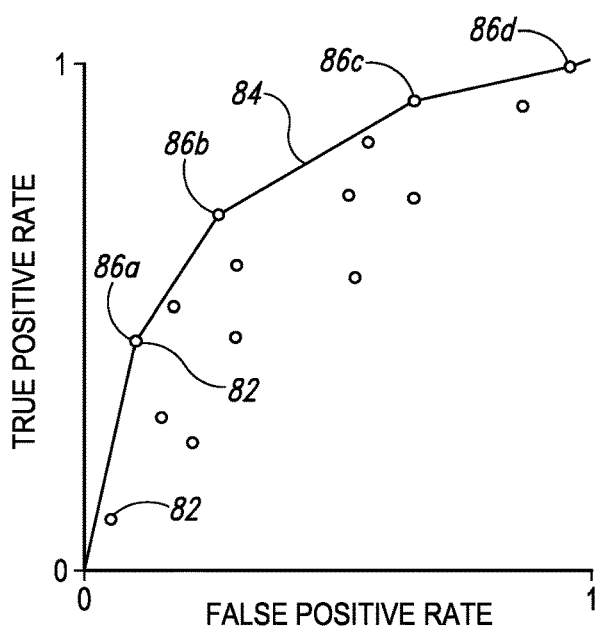
FIG. 5 is an example of a receiver operating characteristic plot.

FIG. 5 is a schematic plot of ROC values of a group of candidate models. Each candidate model is characterized by an ROC performance point 82. Perfect performance would be when the true positive rate is unity and the false positive rate is zero (upper left corner of the plot). Completely imperfect performance would be when the true positive rate is zero and the false positive rate is unity (lower right corner of the plot). Better performing models are more 'northwest' in the plot (toward the upper left corner). The set of models that outperform all other models for each true positive and false positive rate form a convex hull 84 (also referred to as a convex envelope). In the example of FIG. 5, these 'best' performing models are indicated at 86a, 86b, 86c, and 86d. The convex hull 84 is a curve that extends from the point at 0 false positive rate and 0 true positive rate to the point at 1 false positive rate and 1 true positive rate. Between the endpoints, the convex hull 84 is formed of line segments that connect ROC performance points 82 such that the performances of all candidate models are at or below (towards completely imperfect performance) the convex hull 84. The set of models that form the convex hull 84 (the models indicated at 86a-86d) perform better than other candidate models and may be referred to as best and/or optimal among the group of candidate models.

Primary models 66 of the ensemble 64 may be selected from a larger group of models (as illustrated in FIG. 5) and may be selected to be along (or substantially along) the convex hull 84. For example, the primary models 66 of the ensemble 64 may be all, or a subset, of the models along the convex hull 84. Primary models 66 of the ensemble 64 may be dispersed along convex hull 84, i.e., generally spaced apart and defining essentially the entire convex hull 84. Primary models 66 of the ensemble 64 may be uniformly distributed along the convex hull 84, i.e., spaced apart along the convex hull 84 with a substantially uniform distance between neighboring points along the convex hull 84.

The ensemble 64 generally includes at least two models with distinctly different character, for example, one model that is class biased to positive outcomes and one model that is class biased to negative outcomes. For example, the ensemble 64 formed from models illustrated in FIG. 5 may include the model 86a, which has a low false positive rate and a low true positive rate, and the model 86d, which has a high false positive rate and a high true positive rate. The ensemble 64 may include the model along the convex hull 84 that has the lowest false positive rate coupled with a non-trivial (i.e., non-zero) true positive rate, for example the model 86a. The ensemble 64 may include the model along the convex hull 84 that has the highest true positive rate coupled with a non-trivial (i.e., non-unity) false positive rate, for example the model 86d. The models 86b and 86c along the convex hull 84 have intermediate false positive rates and true positive rates relative to the models 86a and 86d.

Candidate models and primary models 66 may be the result of supervised machine learning and/or guided machine learning in which training data (extracted feature data 26 which correspond to known outcomes) are analyzed to discern the underlying functional relationship between the extracted feature data 26 and the outcomes (the positive classification score 76 and the negative classification score 78). The underlying function may be an analytical function, a statistical correlation (e.g., a regression), and/or a classification algorithm. Examples of statistical correlations include logistic regression and probit regression. Examples of classification algorithms include naïve Bayes classifiers, support vector machines, learned decision trees, ensembles of learned decision trees (e.g., random forests of learned decision trees), and neural networks. Models that employ classification algorithms may be referred to as classifiers. Generally, supervised machine learning includes determining the input feature data 26 (the features extracted from the underlying training data), determining the structure of the learned function and corresponding learning algorithm (e.g., support vector machine and/or learned decision trees), applying the learning algorithm to the training data to train the learned function (e.g., the primary model 66), and evaluating the accuracy of the learned function (e.g., applying the learned function to a test data set with known outcomes to verify the performance of the learned function).

Returning to FIG. 4, the performance classification module 64 includes the aggregation module 68. The aggregation module 68 transforms the input positive classification scores 76 and the negative classification scores 78 from all of the primary models 66 of the ensemble 64 of models into the performance indicator 28. The performance indicator 28 reflects the performance status of the component (e.g., present performance or performance within the given number of future flights). The performance indicator 28 may be called the aggregate indicator and/or the aggregate category.

The aggregation module 68 weights the positive classification scores 76 and the negative classification scores 78 according to the individual performances of the primary models 66. Primary models 66 that more reliably predict positive outcomes are weighted higher when that model produces a positive outcome (e.g., positive classification score 76 indicative of the positive class). Primary models 66 that more reliably predict negative outcomes are weighted higher when that model produces a negative outcome (e.g., negative classification score 78 indicative of the negative class). Similarly, primary models 66 that unreliably predict a particular outcome (positive or negative) are weighted lower when that model produces the particular outcome. Hence, the aggregation module 68 may compensate for the inclusion of class-biased models within the ensemble 64. The combined, weighted outcomes of the primary models 66 may more reliably indicate the performance status of the component 44 than any one of the primary models 66 (or any un-weighted combination of the primary models 66).

The weighting scheme performed by the aggregation module 68 may be referred to a trust weighting and/or reliability weighting. The positive classification scores 76 and/or the negative classification scores 78 may be weighted to emphasize and/or deemphasize primary models 66 according to the classification score (or scores). For each positive classification score 76 of the primary models 66, the weight that may be applied may be anti-correlated with the false positive rate (or other measure of the unreliability of a 'positive' determination). For each negative classification score 78 of the primary models 66, the weight that may be applied may be anti-correlated with the false negative rate (or other measure of the unreliability of a 'negative' determination). The weights are anti-correlated with the respective measures in that the weight increases as the measure decreases and the weight decreases as the measure increases. Thus, the primary models 66 with low false positive rates may be treated as more trustworthy and/or reliable when they predict a positive outcome. Likewise, the primary models 66 with low false negative rates may be treated as more trustworthy and/or reliable when they predict a negative outcome.

The same anti-correlated weighting function (a positive weighting function) may be applied to each of the positive classification scores (adjusted for the specific false positive rate of each primary model 66). The same anti-correlated weighting function (a negative weighting function) may be applied to each of the negative classification scores (adjusted for the specific false negative rate of each primary model 66). Typically, the positive weighting function and the negative weighting function are different because the primary models 66 (and more generally the candidate models used to select the primary models 66) are asymmetric in performance. For example, it may be more difficult to produce a model with an incrementally better true positive rate than a model with an incrementally better true negative rate (or vice versa).

The positive weighting function and the negative weighting function may take the form of an inverse exponential function with an exponent proportional to the respective false positive rate (positive weighting function) or the false negative rate (negative weighting function). For example, the weighted positive score (the product of the positive weighting function and the positive classification score of a primary model) may be given by:

$$W_P = Pe^{-\alpha FPR}$$

where $W_P$ is the weighted positive score, P is the positive classification score, FPR is the false positive rate, and $\alpha$ is a constant. The constant $\alpha$ may be determined according to the particular performances of the primary models 66 by optimizing the accuracy of the weighted ensemble 64 with a given set of training data (in which the performance outcomes are known). The weighted negative score (the product of the negative weighting function and the negative classification score of a primary model) may be given by:

$$W_N = Ne^{-\beta FNR}$$

where $W_N$ is the weighted negative score, N is the negative classification score, FNR is the false negative rate, and $\beta$ is a constant. The constant $\beta$ may be determined according to the particular performances of the primary models 66 by optimizing the accuracy of the weighted ensemble 64 with a given set of training data (in which the performance outcomes are known).

The weights may be normalized and/or scaled. As examples, the positive weights may be normalized such that the individual positive weighting functions for each primary model 66 sum to unity. The positive weights may be scaled by dividing the individual positive weighting functions for each primary model 66 by the total number of primary models 66. Likewise, the negative weights may be normalized or scaled in the same manner.

The weighted positive scores of the primary models 66 may be combined by summing (and/or averaging, etc.) the individual weighted positive scores for all (or a subset, e.g., a filtered subset) of the primary models 66. If a subset of primary models 66 contribute to the combined weighted positive score, the subset may be determined according to the positive classification score 76, the negative classification score 78, the weighted positive score, and/or the weighted negative score. For example, only primary models 66 with a positive classification score 76 over a predetermined threshold may contribute to the combined weighted positive score. The weighted negative scores of the primary models 66 may be combined in a manner analogous to the weighted positive scores.

The performance indicator 28 may be determined according to the combined weighted positive score and/or the combined weighted negative score. The combined weighted positive score and/or the combined weighted negative score may be compared to one or more thresholds to determine the performance indicator 28. For example, one threshold may distinguish a positive category of the performance indicator 28 from a negative category. As another category, the positive category may be assigned to values greater than a first threshold and the negative category may be assigned to values less than a second threshold. Values between the first and second threshold may be assigned an unclassified or undetermined category. Further, different thresholds may be applied to different ones of the combined weighted positive score and the combined weighted negative score to determine the performance indicator 28 based on both of the combined weighted positive score and the combined weighted negative score. The thresholds may be determined by optimizing the accuracy of the performance indicator 28 with a given set of training data (in which the performance outcomes are known).

As a specific method of determining the performance indicator 28, the performance indicator 28 may be determined to be a positive category if the combined weighted positive score is greater than a threshold or a negative category if the combined weighted positive score is less than the same threshold. As another method, the performance indicator 28 may be determined to be a positive category if the combined weighted positive score is greater than a first threshold or a negative category if the combined weighted negative score is greater than a second threshold. As yet another method, the performance indicator 28 may be determined to be:

a positive category if the combined weighted positive score is greater than a first threshold and the combined weighted negative score is less than or equal to a second threshold;

a negative category if the combined weighted positive score is less than or equal to the first threshold and the combined weighted negative score is greater than the second threshold; or an unclassified category (or an undetermined category) otherwise (i.e., if both combined weighted scores are greater than the respective threshold or both are less than or equal to the respective threshold).

The first and second thresholds of these examples may be the same. Where the thresholds of these examples are compared to other values, the comparison may be equal, less than, less than or equal to, greater than, or greater than or equal to. Such comparison may be substituted for one another without departing from the scope of this disclosure.

Further, the performance indicator 28 may reflect a confidence level of the determined category. The confidence level may be determined by ranking the combined weighted positive score and/or the combined weighted negative score for the same component 44 on different aircraft 30. Components 44 ranking at the top of the corresponding components merit a higher confidence level that components 44 ranking at the bottom of the corresponding components 44. Additionally or alternatively, the confidence level may be determined by comparing the combined weighted positive score and/or the combined weighted negative score to the threshold(s) utilized to determine the category of the performance indicator 28. Scores near the respective threshold merit a lower confidence level than scores significantly different from the respective threshold.

Where used to predict the future performance of the component 44, the given number of future flights may be different for each of the primary models 66 (though in some embodiments, the given number of future flights may be the same for each of the primary models 66 and the performance indicator 28). The performance indicator 28 may reflect performance within a threshold number of future flights that is related to the given numbers of future flights associated with the primary models 66 (e.g., the threshold number may be the maximum of the given numbers). The number of future flights generally is a time window or horizon that is a relevant period of time to establish the performance status of the component 44 (by the primary models 66, the aggregation module 68, and/or the performance indicator 28). The classification scores of the primary models 66 and the performance indicator 28 may indicate that a non-performance event will or will not happen sometime during the period. Additionally or alternatively, the classification scores of the primary models 66 and the performance indicator 28 may indicate a time until a non-performance event, if one is predicted to occur within the given number of future flights.

The given or threshold number of future flights may be 1 flight, 2 flights, 3 flights, 5 flights, 10 flights, or more. The primary models 66 of the ensemble 64 may relate to a range of given numbers. For example the ensemble 64 may include a first primary model 66 with a future flight window of 1 flight, a second primary model 66 with a future flight window of 2 flights, and up to an Nth primary model 66 with a future flight window of N flights. An ensemble 64 may relate to a future flight window of k flights by including primary models 66 that relate to various subsets of the k flight window (e.g., a sequential series of windows of 1 flight, 2 flights, 3 flights, ..., k flights). The aggregation of the various smaller flight windows of the primary models 66 combined to predict the performance status within the larger flight window (i.e., k flights) of the ensemble 64 as a whole (and the performance indicator 28) may increase the accuracy of the aggregate prediction (the performance indicator 28) relative to the individual predictions (i.e., the positive classification scores 76 and/or the negative classification scores 78) of the primary models 66.

Predictive maintenance systems 10 may include a feature extraction module 62 that is configured to extract feature data 26 from flight data 24 collected during a flight of the aircraft 30. The flight data 24 and the extracted feature data 26 may relate to the performance of the aircraft 30 (e.g., flight performance), the subsystem that includes the selected component, and/or the selected component. The flight data 24 may be collected during a single flight or a series of flights. Using flight data 24 from a series of flights may provide a more reliable prediction of component performance because of the greater amount of flight data 24 and/or because the aircraft 30, the subsystem 32, and/or the component 44 are more likely to be subjected to a greater range of conditions and/or particular stress conditions.

Examples of flight data 24 include an indication of weight on wheels, sensor status (e.g., operating normally, degraded performance, non-responsive), subsystem settings (e.g., propulsion output, payload presence, etc.), component settings (e.g., flight control surface is deployed), sensor values (e.g., airspeed, acceleration, vertical acceleration, strain, velocity, vertical velocity, pitch rate, roll rate, yaw rate, angle of attack, attitude, altitude, heading, position, etc.), control input values (e.g., a control stick position, a control stick lateral position, a control stick longitudinal position, a rudder pedal position, a rudder pedal differential position), engine throttle, a voltage, a current, ambient temperature, and ambient pressure.

Flight data 24 may be collected systematically, e.g., consistently on substantially every flight, consistently in substantially every aircraft 30, and/or on a consistent basis (e.g., periodically). Flight data 24 relating to different sensors 46 and/or control inputs 48 may be collected at different times or at substantially the same time. Flight data 24 relating to the same sensor 46 or control input 48 generally forms a time series (e.g., periodic, quasi-periodic, or aperiodic).

The feature extraction module 62 may be configured to extract feature data 26 that may be correlated to and/or may indicate likely component performance. The feature extraction module 62 may be configured to determine a statistic of sensor values and/or control input values during a time window, a difference of sensor values and/or control input values during a time window, a difference between sensor values and/or control input values measured at different locations and/or different points in time, and/or a statistic of derived sensor values and/or control input values (e.g., an average difference, a moving average etc.). Such differences and/or statistics may be referred to as feature data and/or extracted feature data. Feature data generally is derived from sensor values and/or control input values that relate to the same sensed parameter (e.g., a pressure, a temperature, a speed, a voltage, and a current) and/or the same component 44. The statistic of values may include, and/or may be, a minimum, a maximum, an average, a moving average, a variance, a deviation, a cumulative value, a rate of change, and/or an average rate of change. Additionally or alternatively, the statistic of values may include, and/or may be, a total number of data points, a maximum number of sequential data points, a minimum number of sequential data points, an average number of sequential data points, an aggregate time, a maximum time, a minimum time, and/or an average time that the values are above, below, or about equal to a threshold value. The time window may be the duration of a flight of the aircraft, a portion of the duration of a flight of the aircraft, or a period of time including one or more flights of the aircraft. For example, the time window may be at least 0.1 seconds, at least 1 second, at least 10 seconds, at most 100 seconds, at most 10 seconds, at most 1 second, about 1 second, and/or about 10 seconds.

Additionally or alternatively, the feature extraction module 62 may be configured to analyze and/or extract sensor values and/or control input values within certain constraints.

For example, sensor values and/or control input values may be subject to analysis only if within a predetermined range (e.g., outlier data may be excluded) and/or if other sensor values and/or control input values are within a predetermined range (e.g., one sensor value may qualify the acceptance of another sensor value).

The ensemble 64 of related primary models 66 may be applied to the feature data 26 extracted from the flight data 24 from one or more previous flights. Generally, each primary model 66 is supplied the same feature data 26.

Predictive maintenance systems 10 may include a flight data collection module 70 that is configured to collect flight data 24 during one or more flights. Flight data 24 may be collected by the controller(s) 50 and/or the sensor(s) 46 as described herein. The flight data collection module 70 may be configured to collect flight data 24 automatically, e.g., whenever the aircraft 30 is flown.

Predictive maintenance systems 10 may include a display module 72 that is configured to communicate the results of the performance classification module 60 to the user (e.g., the aircrew or ground crew). For example, the display module 72 may be configured to communicate the performance indicator 28. The display module 72 may be configured to communicate system information, such as the identity of the selected component 44.

Figure 6:
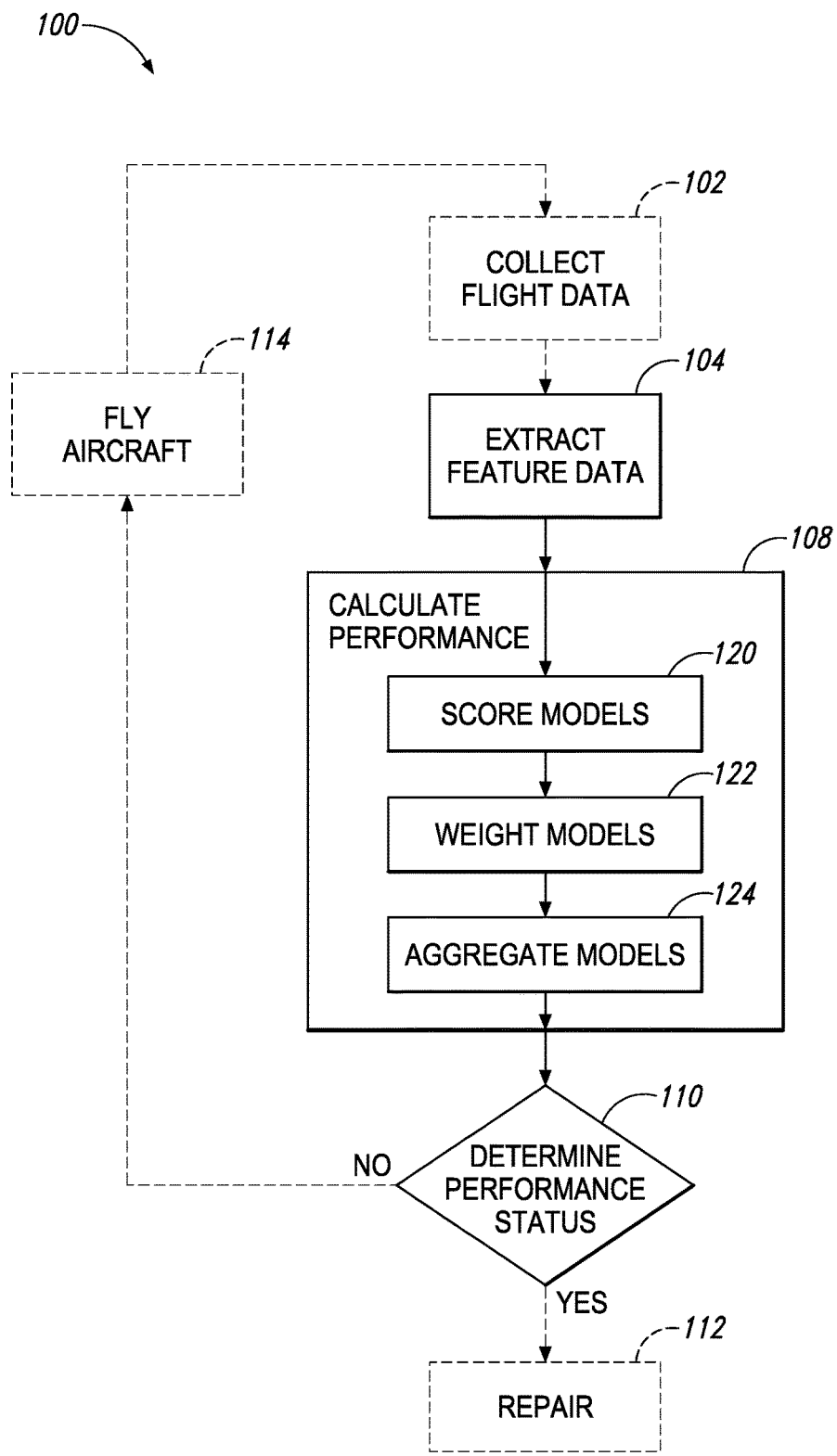
FIG. 6 is a schematic representation of predictive maintenance methods.

FIG. 6 schematically illustrates predictive maintenance methods 100 for a selected component (such as component 44). Methods 100 may be utilized to impact health management of aircraft systems. By reliably predicting future component performance (e.g., a future non-performance event) and thereby enabling a more predictive schedule for repairs and demand for spare parts, methods 100 may contribute to overall aircraft maintenance, fleet management, and material logistics. Methods 100 may include methods of preventative maintenance, methods of determining performance status, and/or methods of determining impending non-performance of components and/or systems.

Methods 100 include calculating performance 108 of the selected component based on feature data (e.g., feature data 26) and methods 100 may include extracting 104 feature data (e.g., feature data 26) from flight data (e.g., flight data 24) and/or determining 110 performance status of the selected component. Methods 100 may include operating and/or utilizing the predictive maintenance system 10.

Calculating performance 108 includes calculating a performance indicator (e.g., performance indicator 28) that reflects a performance status of the selected component of the aircraft (e.g., aircraft 30). For example, the performance indicator may reflect whether the selected component is likely to perform or not within the given number of future flights. Calculating performance 108 may include operating and/or utilizing the performance classification module 60.

Calculating performance 108 may include scoring models 120, weighting models 122, and aggregating models 124. Scoring models 120 includes applying an ensemble of related models (e.g., ensemble 64 of related primary models 66) to the feature data extracted from flight data to produce a positive classification score and/or a negative classification score (e.g., positive classification score 76 and/or negative classification score 78). As described with respect to the ensemble 64 and the primary models 66, the models may be characterized by various performance measures such as the ROC, false positive rate, true positive rate, etc. The ensemble of related models may include models with different ROC and may include models from a convex hull (i.e., convex hull 84).

Weighting models 122 includes weighting the positive classification score and/or the negative classification score of each model of the ensemble according to the individual performance measures of the models to respectively produce a weighted positive score and/or a weighted negative score. Weighting models 122 includes trust weighting, as described with respect to ensemble 64, primary models 66, and aggregation module 68. Models that more reliably predict positive outcomes are weighted higher when that model produces a positive outcome. Models that more reliably predict negative outcomes are weighted higher when that model produces a negative outcome. Weights applied to the positive classification scores and/or the negative classification scores may be anti-correlated with the respective false positive rate (or other measure of the unreliability of a 'positive' determination) and the false negative rate (or other measure of the unreliability of a 'negative' determination). Weighting models 122 may include operating and/or utilizing the aggregation module 68.

Aggregating models 124 includes combining the weighted positive and/or negative scores and determining the performance indicator according to the combined weighted scores. Aggregating models 124 may include summing (and/or averaging, etc.) the individual weighted positive scores and/or summing (and/or averaging, etc.) the individual weighted negative scores, as described with respect to ensemble 64, primary models 66, and aggregation module 68. The performance indicator may be determined based on the combined weighted positive score and/or the combined weighted negative score relative to one or more thresholds as described with respect to ensemble 64, primary models 66, and aggregation module 68. Aggregating models 124 may include operating and/or utilizing the aggregation module 68.

Methods 100 may include extracting 104 feature data from flight data collected during a flight of the aircraft. As described herein, flight data and/or feature data may relate to the performance of the aircraft (e.g., flight performance), a subsystem of the aircraft that includes the selected component, and/or the selected component. Extracting 104 may include operating and/or utilizing the feature extraction module 62. Extracting 104 may include determining a statistic of sensor values during a time window, a difference of sensor values during a time window, and/or a difference between sensor values measured at different locations and/or different points in time as described with respect to the feature extraction module 62.

Methods 100 may include collecting 102 flight data during a flight of the aircraft. Collecting 102 may include collecting flight data for a series of flights. Collecting 102 may include operating and/or utilizing the flight data collection module 70, the controller(s) 50, the sensor(s) 46, the control input(s) 48, and/or the aircraft 30 (e.g., if flight data collection module 70 is configured to collect flight data whenever the aircraft is flown). Methods 100 may include flying 114 the aircraft. Flying 114 the aircraft may cause collecting 102. Flying 114 may include routine flying or flying to stress and/or to test the aircraft, the subsystem including the selected component, and/or the selected component.

Methods 100 may include displaying the performance status and/or the performance indicator (and/or a representation relating to the performance status and/or the performance indicator) by visual, audio, and/or tactile display, for example, by utilizing and/or operating the input-output device 216 and/or the display module 72. Additionally or alternatively, methods 100 may include signaling by visual, audio, and/or tactile indicator that the selected component is likely to perform or to have a non-performance event within the threshold number of future flights. The displaying and/or signaling may include on-board (on platform) and/or off-board (off platform) displays and/or signals.

Methods 100 may include determining 110 the performance status of the selected component based on the performance indicator. Determining 110 may include determining whether the selected component is likely to perform or not, presently and/or within the given number of future flights. Determining 110 may include determining the state of the performance indicator and/or evaluating the value of the performance indicator relative to a predetermined limit (e.g., less than, greater than, and/or about equal to the limit). For example, the need for maintenance may be associated with performance indicators indicating an impending-non-performance state with a likelihood greater than a predetermined limit.

Methods 100 may further include repairing 112 the selected component. Repairing 112 may include repairing, replacing, refurbishing, mitigating, and/or servicing (e.g., lubricating, cleaning) the selected component. Methods 100 may include determining whether to repair and/or repairing 112 upon determining 110 the performance status (e.g., determining that a repair would be useful and/or warranted based on the performance indicator). For example, determining whether to repair may include evaluating the value of the performance indicator relative to a predetermined limit (e.g., less than, greater than, and/or about equal to the limit). Where methods 100 include a form of repairing (e.g., repairing 112, repairing 112 upon determining that a repair would be useful, and/or determining whether to repair), methods 100 may be referred to as preventative maintenance methods.

FIG. 7 schematically represents a computerized system 200 that may be used to implement and/or instantiate the methods, components, and features described herein, for example, predictive maintenance systems 10 and associated components, such as controller 50, flight data collection module 70, feature extraction module 62, performance classification module 60, aggregation module 68, and/or display module 72. The computerized system 200 includes a processing unit 202 operatively coupled to a computer-readable memory 206 by a communications infrastructure 210. The processing unit 202 may include one or more computer processors 204 and may include a distributed group of computer processors 204. The processing unit 202 may include, or be implemented on, programmable, reconfigurable, and/or dedicated hardware such as field-programmable gate arrays, digital signal processors, and/or application specific integrated circuits.

The computerized system 200 also may include a computer-readable storage media assemblage 212 that is operatively coupled to the processing unit 202 and/or the computer-readable memory 206, e.g., by communications infrastructure 210. The computer-readable storage media assemblage 212 may include one or more non-transitory computer-readable storage media 214 and may include a distributed group of non-transitory computer-readable storage media 214. The computer-readable memory 206, the computer-readable storage media assemblage 212, and the non-transitory computer-readable media 214 are each computer readable media. Computer-readable media are tangible and are not merely transitory signals.

The communications infrastructure 210 may include a local data bus, a communication interface, and/or a network interface. The communications infrastructure 210 may be configured to transmit and/or to receive signals, such as electrical, electromagnetic, optical, and/or acoustic signals. For example, the communications infrastructure 210 may be configured to manage data link 54.

The computerized system 200 may include one or more input-output devices 216 operatively coupled to the processing unit 202, the computer-readable memory 206, and/or the computer-readable storage media assemblage 212. Input-output devices 216 may be configured for visual, audio, and/or tactile input and/or output from and/or to the operator (e.g., the aircrew). Each input-output device 216 independently may be configured for only input, only output, primarily input, primarily output, and/or a combination of input and output. Examples of input-output devices 216 include monitors (e.g., video monitor), displays (e.g., alpha-numeric displays, lamps, and/or LEDs), keyboards, pointing devices (e.g., mice), touch screens, speakers, buzzers, and controls (e.g., buttons, knobs, etc.). The display module 72 may include and/or may be an input-output device 216.

The computerized system 200 may include a distributed group of computers, servers, workstations, etc., which each may be interconnected directly or indirectly (including by network connection). Thus, the computerized system 200 may include one or more processing units 202, computer-readable memories 206, computer-readable storage media assemblages 212, and/or input-output devices 216 that are located remotely from one another.

One or both of the computer-readable memory 206 and the computer-readable storage media assemblage 212 include control logic 220 and/or data 222. Control logic 220 (which may also be referred to as software, firmware, gateware, and/or hardware) may include instructions that, when executed by the processing unit 202, cause the computerized system 200 to perform one or more of the methods described herein. Control logic 220 and/or data 222 may include applications (e.g., a control application), resources, access controls, and/or associated information. Control logic 220 may include one or more of the flight data collection module 70, feature extraction module 62, performance classification module 60, ensemble 64 of related primary models 66, primary models 66, aggregation module 68, and/or display module 72. Data 222 may include flight database 12, flight data 24, feature data 26, and/or data associated with the modules, models, and/or methods described herein.

Where modules, models, and/or methods are described as performing one or more functions, the respective device is configured, e.g., programmed, to perform the function(s). The respective device may include one or more programs, agents, services, and/or components configured, e.g., programmed, to perform the function(s) when the programs, agents, services, and/or components are executed by the processing unit 202 or otherwise operated by the computerized system 200. The control logic 220 and/or data 222 may include instructions and/or information corresponding to the programs, agents, services, and/or components.

Examples of inventive subject matter according to the present disclosure are described in the following enumerated paragraphs.

A1. A method of determining a performance status of a selected component in an aircraft, the method comprising:

extracting feature data from flight data collected during a flight of the aircraft, wherein the feature data relates to performance of one or more components of the aircraft;

applying an ensemble of related models to produce, for each model, a positive score and a complementary negative score related to performance of the selected component, optionally within a given number of future flights of the aircraft, wherein each model is characterized by a false positive rate and a false negative rate, and optionally has an ROC (receiver operating characteristic);

weighting the positive score of each model to produce a weighted positive score for each model based on the false positive rate of that model such that the weighted positive score of each model is anti-correlated with the false positive rate of that model;

weighting the negative score of each model to produce a weighted negative score for each model based on the false negative rate of that model such that the weighted negative score of each model is anti-correlated with the false negative rate of that model; and determining the performance status of the selected component, optionally within the given number of future flights, as one of:
- a positive category if an average of the weighted positive scores of the models of the ensemble of related models is greater than a threshold value and an average of the weighted negative scores of the models of the ensemble of related models is less than or equal to the threshold value;
- a negative category if the average of the weighted positive scores is less than or equal to the threshold value and the average of the weighted negative scores is greater than the threshold value; or
- an unclassified category if both of the average of the weighted positive scores and the average of the weighted negative scores are greater than the threshold value or both are less than or equal to the threshold value.

A1.1. The method of paragraph A1, wherein the average of the weighted positive scores of the models of the ensemble of related models is an average of the weighted positive scores of a subset, optionally all, of the models of the ensemble of related models.

A1.2. The method of any of paragraphs A1-A1.1, wherein the average of the weighted negative scores of the models of the ensemble of related models is an average of the weighted negative scores of a subset of, optionally all, of the models of the ensemble of related models.

A2. The method of any of paragraphs A1-A1.2, wherein each model has a unique ROC among the ensemble of related models.

A3. The method of any of paragraphs A1-A2, further comprising selecting the models of the ensemble of related models from a group of candidate models each having an ROC, wherein the models of the ensemble of related models are along a convex ROC hull of the group of candidate models.

A3.1. The method of paragraph A3, wherein the models of the ensemble of related models are dispersed along the convex ROC hull of the group of candidate models.

A3.2. The method of any of paragraphs A3-A3.1, wherein the models of the ensemble of related models are uniformly distributed along the convex ROC hull of the group of candidate models.

A4. The method of any of paragraphs A1-A3.2, wherein at least one model of the ensemble of related models is class biased.

A4.1. The method of paragraph A4, wherein the ensemble of related models includes a model that has a positive class bias and a model that has a negative class bias.

A5. The method of any of paragraphs A1-A4.1, wherein the positive score and the negative score of at least one model, optionally of all models, relate respectively to a first category of a binary classification and a second category of the binary classification.

A6. The method of any of paragraphs A1-A5, wherein at least one, optionally each, of the models of the ensemble of related models is a classifier.

A7. The method of any of paragraphs A1-A6, wherein each model is the result of guided machine learning.

A8. The method of any of paragraphs A1-A7, wherein at least one, optionally each, model includes, optionally is, at least one of a naïve Bayes classifier, a support vector machine, a learned decision tree, an ensemble of learned decision trees, or a neural network.

A9. The method of any of paragraphs A1-A8, wherein at least one, optionally each, model includes at least one of a statistical correlation or a regression.

A10. The method of any of paragraphs A1-A9, wherein the positive score of each model indicates a likelihood of non-performance of the selected component and wherein the complementary negative score of each model indicates a likelihood of continued performance of the selected component.

A11. The method of any of paragraphs A1-A10, wherein the weighted positive score for each model is a product of the positive score of the respective model and an inverse exponential with an exponent proportional to the false positive rate of the respective model.

A12. The method of any of paragraphs A1-A11, wherein the weighted negative score for each model is a product of the negative score of the respective model and an inverse exponential with an exponent proportional to the false negative rate of the respective model.

A13. The method of any of paragraphs A1-A12, further comprising determining a likelihood of non-performance of the selected component, optionally within the given number of future flights, based on the average of the weighted positive scores and/or the average of the weighted negative scores.

A14. The method of any of paragraphs A1-A13, further comprising determining a confidence level in the performance status of the selected component based on the average of the weighted positive scores and/or the average of the weighted negative scores.

A15. The method of any of paragraphs A1-A14, wherein the positive score for each model indicates an impending non-performance event of the selected component, optionally within the given number of future flights.

A16. The method of any of paragraphs A1-A15, wherein the negative score for each model indicates no impending non-performance event of the selected component, optionally within the given number of future flights.

A17. The method of any of paragraphs A1-A16, wherein the flight data was collected during a series of flights.

A18. The method of any of paragraphs A1-A17, further comprising collecting the flight data during a flight or series of flights of the aircraft.

A18.1. The method of paragraph A18, wherein the collecting includes collecting the flight data with a sensor on board the aircraft.

A19. The method of any of paragraphs A1-A18.1, wherein the flight data was collected with a sensor on board the aircraft.

A20. The method of any of paragraphs A1-A19, wherein the extracting includes determining a statistic of flight data during a time window, and optionally wherein the flight data includes sensor values and/or control input values.

A20.1. The method of paragraph A20, wherein the statistic includes, optionally is, at least one of a minimum, a maximum, an average, a moving average, a variance, a skewness, a kurtosis, a deviation, a cumulative value, a rate of change, or an average rate of change.

A20.2. The method of any of paragraphs A20-A20.1, wherein the statistic includes, optionally is, at least one of a total number of data points, a maximum number of sequential data points, a minimum number of sequential data points, an average number of sequential data points, an aggregate time, a maximum time, a minimum time, and/or an average time that the sensor values are above, below, or about equal to a threshold value.

A20.3. The method of any of paragraphs A20-A20.2, wherein the time window includes, optionally is, a duration of the flight, a portion of a duration of the flight, and/or a period of time including one or more flights of the aircraft, and optionally wherein the time window includes a duration of each of a/the series of flights.

A20.4. The method of any of paragraphs A20-A20.3, wherein the time window is at most 10 seconds or at most 1 second.

A20.5. The method of any of paragraphs A20-A20.4, wherein the sensor values include at least one of an airspeed, a strain, a temperature, a voltage, a current, an ambient temperature, an ambient pressure, an acceleration, a vertical acceleration, a velocity, a vertical velocity, a pitch rate, a roll rate, a yaw rate, an angle of attack, an attitude, an altitude, a heading, or a component position.

A20.6. The method of any of paragraphs A20-A20.5, wherein the sensor values include a first sensor value relating to the selected component and a second sensor value relating to another component of the aircraft.

A21. The method of any of paragraphs A1-A20.6, wherein the extracting includes determining a difference of sensor values and/or control input values during a time window and optionally wherein the flight data includes the sensor values and/or the control input values.

A21.1. The method of paragraph A21, wherein the time window includes, optionally is, a duration of the flight, a portion of a duration of the flight, and/or a period of time including one or more flights of the aircraft, and optionally wherein the time window includes a duration of each of a/the series of flights.

A21.2. The method of any of paragraphs A21-A21.1, wherein the time window is at most 10 seconds or at most 1 second.

A21.3. The method of any of paragraphs A21-A21.2, wherein the sensor values include at least one of an airspeed, a strain, a temperature, a voltage, a current, an ambient temperature, an ambient pressure, an acceleration, a vertical acceleration, a velocity, a vertical velocity, a pitch rate, a roll rate, a yaw rate, an angle of attack, an attitude, an altitude, a heading, or a component position.

A21.4. The method of any of paragraphs A21-A21.3, wherein the sensor values include a first sensor value relating to the selected component and a second sensor value relating to another component of the aircraft.

A21.5. The method of any of paragraphs A21-A21.4, wherein the extracting includes determining a statistic of the difference of sensor values and/or control input values during the time window.

A22. The method of any of paragraphs A1-A21.5, wherein the extracting includes determining a difference between a first sensor or control input value and a second sensor or control input value, and wherein the flight data includes the first sensor or control input value and the second sensor or control input value.

A22.1. The method of paragraph A22, wherein the first sensor or control input value is either a first sensor value or a first control input value.

A22.2. The method of any of paragraphs A22-A22.1, wherein the second sensor or control input value is either a second sensor value or a second control input value.

A22.3. The method of any of paragraphs A22-A22.2, wherein the first sensor or control input value and the second sensor or control input value relate to a sensed parameter, and optionally wherein the sensed parameter is selected from the group of a rate, a velocity, an acceleration, a position, a pressure, a temperature, a speed, a strain, a voltage, and a current.

A22.4. The method of any of paragraphs A22-A22.3, wherein the first sensor or control input value and the second sensor or control input value are measured at different locations.

A22.5. The method of any of paragraphs A22-A22.4, wherein the first sensor or control input value and the second sensor or control input value are measured at different points in time.

A22.6. The method of any of paragraphs A22-A22.5, wherein the first sensor or control input value relates to the selected component and the second sensor or control input value relates to another component of the aircraft.

A22.7. The method of any of paragraphs A22-A22.6, wherein the extracting includes determining a statistic of the difference between the first sensor or control input value and the second sensor or control input value.

A23. The method of any of paragraphs A1-A22.7, wherein the feature data includes at least one derived signal selected from a minimum of a sensor value, a maximum of a sensor value, an average of a sensor value, a moving average of a sensor value, a variance of a sensor value, a skewness of a sensor value, a kurtosis of a sensor value, a deviation of a sensor value, a cumulative value of a sensor value, a difference of sensor values, a minimum of a control input value, a maximum of a control input value, an average of a control input value, a moving average of a control input value, a variance of a control input value, a skewness of a control input value, a kurtosis of a control input value, a deviation of a control input value, a cumulative value of a control input value, a difference of control input values, or a statistic of any of the above derived signals.

A24. The method of any of paragraphs A1-A23, further comprising displaying the performance status by visual, audio, and/or tactile display.

A25. The method of any of paragraphs A1-A24, further comprising signaling by visual, audio, and/or tactile indicator that the selected component is likely to have a non-performance event.

A26. A computerized system comprising:
a computer-readable memory;
a processing unit operatively coupled to the computer-readable memory; and
a computer-readable storage media assemblage, wherein the storage media assemblage is operatively coupled to the computer-readable memory and includes instructions, that when executed by the processing unit, cause the system to perform the method of any of paragraphs A1-A25.

A27. A method of preventive maintenance for an aircraft, the method comprising:
performing the method of any of paragraphs A1-A25, wherein determining the performance status includes determining the performance status is a positive category; and repairing the selected component before the given number of future flights.

B1. A system for determining a performance status of a selected component in an aircraft, the system comprising:
  a feature extraction module configured to extract feature data from flight data collected during a flight of the aircraft, wherein the feature data relates to performance of one or more components of the aircraft;
  a performance classification module configured to determine a performance status of the selected component of the aircraft, optionally within a given number of future flights of the aircraft, based on the feature data, wherein the performance classification module is programmed to:
    apply an ensemble of related models to produce, for each model, a positive score and a complementary negative score related to performance of the selected component, optionally within the given number of future flights, wherein each model has an ROC (receiver operating characteristic) and is characterized by a false positive rate and a false negative rate;
    weight the positive score of each model to produce a weighted positive score for each model based on the false positive rate of that model such that the weighted positive score of each model is anti-correlated with the false positive rate of that model;
    weight the negative score of each model to produce a weighted negative score for each model based on the false negative rate of that model such that the weighted negative score of each model is anti-correlated with the false negative rate of that model; and
    determine the performance status of the selected component, optionally within the given number of future flights, as one of:
      a positive category if an average of the weighted positive scores of all of the models of the ensemble of related models is greater than a threshold value and an average of the weighted negative scores of all of the models of the ensemble of related models is less than or equal to the threshold value;
      a negative category if the average of the weighted positive scores is less than or equal to the threshold value and the average of the weighted negative scores is greater than the threshold value; or
      an unclassified category if both of the average of the weighted positive scores and the average of the weighted negative scores are greater than the threshold value or both are less than or equal to the threshold value.

B1.1. The system of paragraph B1, wherein the system is a system for determining impending component non-performance in the aircraft.

B2. The system of any of paragraphs B1-B1.1, wherein each model has a unique ROC among the ensemble of related models.

B3. The system of any of paragraphs B1-B2, wherein the models of the ensemble of related models are selected from a group of candidate models each having an ROC, wherein the models of the ensemble of related models are along a convex ROC hull of the group of candidate models.

B3.1. The system of paragraph B3, wherein the models of the ensemble of related models are dispersed along the convex ROC hull of the group of candidate models.

B3.2. The system of any of paragraphs B3-B3.1, wherein the models of the ensemble of related models are uniformly distributed along the convex ROC hull of the group of candidate models.

B4. The system of any of paragraphs B1-B3.2, wherein at least one model of the ensemble of related models is class biased.

B4.1. The system of paragraph B4, wherein the ensemble of related models includes a model that has a positive class bias and a model that has a negative class bias.

B5. The system of any of paragraphs B1-B4.1, wherein the positive score and the negative score of at least one model, optionally of all models, relate respectively to a first category of a binary classification and a second category of the binary classification.

B6. The system of any of paragraphs B1-B5, wherein at least one, optionally each, of the models of the ensemble of related models is a classifier.

B7. The system of any of paragraphs B1-B6, wherein each model is the result of guided machine learning.

B8. The system of any of paragraphs B1-B7, wherein at least one, optionally each, model includes, optionally is, at least one of a naïve Bayes classifier, a support vector machine, a learned decision tree, an ensemble of learned decision trees, or a neural network.

B9. The system of any of paragraphs B1-B8, wherein at least one, optionally each, model includes at least one of a statistical correlation or a regression.

B10. The system of any of paragraphs B1-B9, wherein the positive score of each model indicates a likelihood of non-performance of the selected component and wherein the complementary negative score of each model indicates a likelihood of continued performance of the selected component.

B11. The system of any of paragraphs B1-B10, wherein the weighted positive score is a product of the positive score of the respective model and an inverse exponential with an exponent proportional to the false positive rate of the respective model.

B12. The system of any of paragraphs B1-B11, wherein the weighted negative score is a product of the negative score of the respective model and an inverse exponential with an exponent proportional to the false negative rate of the respective model.

B13. The system of any of paragraphs B1-B12, wherein the performance classification module is further programmed to determine a likelihood of non-performance of the selected component, optionally within the given number of future flights, based on the average of the weighted positive scores and/or the average of the weighted negative scores.

B14. The system of any of paragraphs B1-B13, wherein the performance classification module is further programmed to determine a confidence level in the performance status of the selected component based on the average of the weighted positive scores and/or the average of the weighted negative scores.

B15. The system of any of paragraphs B1-B14, wherein the positive score for each model indicates an impending non-performance event of the selected component, optionally within the given number of future flights.

B16. The system of any of paragraphs B1-B15, wherein the negative score for each model indicates no impending non-performance event of the selected component, optionally within the given number of future flights.

B17. The system of any of paragraphs B1-B16, further comprising a data link configured to communicate with a flight data storage system, and optionally wherein the flight data storage system is on board the aircraft.

B18. The system of any of paragraphs B1-B17, further comprising a display, wherein the display is configured to indicate the performance status with a visual, audio, and/or tactile display.

B19. The system of any of paragraphs B1-B18, further comprising a sensor on board the aircraft, wherein the sensor is configured to collect flight data during the flight of the aircraft.

B20. The system of any of paragraphs B1-B19, wherein the feature extraction module is configured to determine a statistic of flight data during a time window, and optionally wherein the flight data includes sensor values and/or control input values.

B20.1. The system of paragraph B20, wherein the statistic includes, optionally is, at least one of a minimum, a maximum, an average, a moving average, a variance, a skewness, a kurtosis, a deviation, a cumulative value, a rate of change, or an average rate of change.

B20.2. The system of any of paragraphs B20-B20.1, wherein the statistic includes, optionally is, at least one of a total number of data points, a maximum number of sequential data points, a minimum number of sequential data points, an average number of sequential data points, an aggregate time, a maximum time, a minimum time, or an average time that the sensor values are above, below, or about equal to a threshold value.

B20.3. The system of any of paragraphs B20-B20.2, wherein the time window includes, optionally is, a duration of the flight, a portion of a duration of the flight, and/or a period of time including one or more flights of the aircraft.

B20.4. The system of any of paragraphs B20-B20.3, wherein the time window is at most 10 seconds or at most 1 second.

B20.5. The system of any of paragraphs B20-B20.4, wherein the sensor values include at least one of an airspeed, a strain, a temperature, a voltage, a current, an ambient temperature, an ambient pressure, an acceleration, a vertical acceleration, a velocity, a vertical velocity, a pitch rate, a roll rate, a yaw rate, an angle of attack, an attitude, an altitude, a heading, or a component position.

B20.6. The system of any of paragraphs B20-B20.5, wherein the sensor values include a first sensor value relating to the selected component and a second sensor value relating to another component of the aircraft.

B20.7. The system of any of paragraphs B20-B20.6, wherein the control input values include a first control input value relating to the selected component and a second control input value relating to another component of the aircraft.

B21. The system of any of paragraphs B1-B20.7, wherein the feature extraction module is configured to determine a difference of sensor values and/or control input values during a time window and optionally wherein the flight data includes the sensor values and/or the control input values.

B21.1. The system of paragraph B21, wherein the time window includes, optionally is, a duration of the flight, a portion of a duration of the flight, and/or a period of time including one or more flights of the aircraft.

B21.2. The system of any of paragraphs B21-B21.1, wherein the time window is at most 10 seconds or at most 1 second.

B21.3. The system of any of paragraphs B21-B21.2, wherein the sensor values include at least one of an airspeed, a strain, a temperature, a voltage, a current, an ambient temperature, an ambient pressure, an acceleration, a vertical acceleration, a velocity, a vertical velocity, a pitch rate, a roll rate, a yaw rate, an angle of attack, an attitude, an altitude, a heading, or a component position.

B21.4. The system of any of paragraphs B21-B21.3, wherein the sensor values include a first sensor value relating to the selected component and a second sensor value relating to another component of the aircraft.

B21.5. The system of any of paragraphs B21-B21.4, wherein the control input values include a first control input value relating to the selected component and a second control input value relating to another component of the aircraft.

B21.6. The system of any of paragraphs B21-B21.5, wherein the feature extraction module is configured to determine a statistic of the difference of sensor values and/or control input values during the time window.

B22. The system of any of paragraphs B1-B21.6, wherein the feature extraction module is configured to determine a difference between a first sensor or control input value and a second sensor or control input value, and wherein the flight data includes the first sensor or control input value and the second sensor or control input value.

B22.1. The system of paragraph B22, wherein the first sensor or control input value is either a first sensor value or a first control input value.

B22.2. The system of any of paragraphs B22-B22.1, wherein the second sensor or control input value is either a second sensor value or a second control input value.

B22.3. The system of any of paragraphs B22-B22.2, wherein the first sensor or control input value and the second sensor or control input value relate to a sensed parameter, and optionally wherein the sensed parameter is selected from the group of a rate, a velocity, an acceleration, a position, a pressure, a temperature, a speed, a strain, a voltage, and a current.

B22.4. The system of any of paragraphs B22-B22.3, wherein the first sensor or control input value and the second sensor or control input value are measured at different locations.

B22.5. The system of any of paragraphs B22-B22.4, wherein the first sensor or control input value and the second sensor or control input value are measured simultaneously or at different points in time.

B22.6. The system of any of paragraphs B22-B22.5, wherein the first sensor or control input value relates to the selected component and the second sensor or control input value relates to another component of the aircraft.

B22.7. The system of any of paragraphs B22-B22.6, wherein the feature extraction module is configured to determine a statistic of the difference between the first sensor value or control input value and the second sensor or control input value.

B23. The system of any of paragraphs B1-B22.7, further comprising:
a computer-readable memory;
a processing unit operatively coupled to the computer-readable memory; and
a computer-readable storage media assemblage, wherein the storage media assemblage is operatively coupled to the computer-readable memory and includes the feature extraction module and the performance classification module.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entities in the list of entities, and is not limited to at least one of each and every entity specifically listed within the list of entities. For example, "at least one of A and B" (or, equivalently, "at least one of A or B," or, equivalently, "at least one of A and/or B") may refer to A alone, B alone, or the combination of A and B.

As used herein, the singular forms "a", "an" and "the" may be intended to include the plural forms as well, unless the context clearly indicates otherwise.

The various disclosed elements of systems and apparatuses and steps of methods disclosed herein are not required of all systems, apparatuses, and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system, apparatus, or method. Accordingly, such inventive subject matter is not required to be associated with the specific systems, apparatuses, and methods that are expressly disclosed herein, and such inventive subject matter may find utility in systems, apparatuses, and/or methods that are not expressly disclosed herein.

The invention claimed is:

1. A computer-implemented method of determining a performance status of a selected component in an aircraft, the method comprising:
   extracting feature data from flight data collected by sensors during a flight of the aircraft, wherein the feature data relates to performance of one or more components of the aircraft;
   applying an ensemble of related machine learning models to produce, for each model, a positive score and a complementary negative score related to performance of the selected component, wherein each model is characterized by a false positive rate and a false negative rate;
   weighting the positive score of each model to produce a weighted positive score for each model based on the false positive rate of that model such that the weighted positive score of each model is anti-correlated with the false positive rate of that model;
   weighting the negative score of each model to produce a weighted negative score for each model based on the false negative rate of that model such that the weighted negative score of each model is anti-correlated with the false negative rate of that model; and
   determining the performance status of the selected component as one of:
      a positive category when an average of the weighted positive scores of the models of the ensemble of related machine learning models is greater than a threshold value and an average of the weighted negative scores of the models of the ensemble of related machine learning models is less than or equal to the threshold value;
      a negative category when the average of the weighted positive scores is less than or equal to the threshold value and the average of the weighted negative scores is greater than the threshold value; or
      an unclassified category when both of the average of the weighted positive scores and the average of the weighted negative scores are greater than the threshold value or both are less than or equal to the threshold value.

2. The method of claim 1, further comprising selecting the models of the ensemble of related machine learning models from a group of candidate models each having an ROC (receiver operating characteristic), wherein the models of the ensemble of related machine learning models are along a convex ROC hull of the group of candidate models.

3. The method of claim 2, wherein the models of the ensemble of related machine learning models are dispersed along the convex ROC hull of the group of candidate models.

4. The method of claim 1, wherein the ensemble of related machine learning models includes a model that has a positive class bias and a model that has a negative class bias.

5. The method of claim 1, wherein each model includes at least one of a naïve Bayes classifier, a support vector machine, a learned decision tree, an ensemble of learned decision trees, or a neural network.

6. The method of claim 1, wherein the weighted positive score for each model is a product of the positive score of the respective model and an inverse exponential with an exponent proportional to the false positive rate of the respective model.

7. The method of claim 1, wherein the weighted negative score for each model is a product of the negative score of the respective model and an inverse exponential with an exponent proportional to the false negative rate of the respective model.

8. The method of claim 1, further comprising determining a likelihood of non-performance of the selected component based on the average of the weighted positive scores and the average of the weighted negative scores.

9. The method of claim 1, further comprising collecting the flight data during a series of flights of the aircraft.

10. The method of claim 1, further comprising signaling by visual, audio, and/or tactile indicator that the selected component is likely to have a non-performance event.

11. A computerized system comprising:
a computer-readable memory;
a processing unit operatively coupled to the computer-readable memory; and
a computer-readable storage media assemblage, wherein the storage media assemblage is operatively coupled to the computer-readable memory and includes instructions, that when executed by the processing unit, cause the system to:
  extract feature data from flight data collected by sensors during a flight of the aircraft, wherein the feature data relates to performance of one or more components of the aircraft;
  apply an ensemble of related machine learning models to produce, for each model, a positive score and a complementary negative score related to performance of the selected component, wherein each model is characterized by a false positive rate and a false negative rate;
  weight the positive score of each model to produce a weighted positive score for each model based on the false positive rate of that model such that the weighted positive score of each model is anti-correlated with the false positive rate of that model;
  weight the negative score of each model to produce a weighted negative score for each model based on the false negative rate of that model such that the weighted negative score of each model is anti-correlated with the false negative rate of that model; and
  determine a performance status of the selected component as one of:
    a positive category when an average of the weighted positive scores of the models of the ensemble of related machine learning models is greater than a threshold value and an average of the weighted negative scores of the models of the ensemble of related machine learning models is less than or equal to the threshold value;
    a negative category when the average of the weighted positive scores is less than or equal to the threshold value and the average of the weighted negative scores is greater than the threshold value; or
    an unclassified category when both of the average of the weighted positive scores and the average of the weighted negative scores are greater than the threshold value or both are less than or equal to the threshold value.

12. A system for determining a performance status of a selected component in an aircraft, the system comprising:
a feature extraction module configured to extract feature data from flight data collected by sensors during a flight of the aircraft, wherein the feature data relates to performance of one or more components of the aircraft;
a performance classification module configured to determine a performance status of the selected component of the aircraft based on the feature data, wherein the performance classification module is programmed to:
  apply an ensemble of related machine learning models to produce, for each model, a positive score and a complementary negative score related to performance of the selected component, wherein each model has an ROC (receiver operating characteristic) characterized by a false positive rate and a false negative rate;
  weight the positive score of each model to produce a weighted positive score for each model based on the false positive rate of that model such that the weighted positive score of each model is anti-correlated with the false positive rate of that model;
  weight the negative score of each model to produce a weighted negative score for each model based on the false negative rate of that model such that the weighted negative score of each model is anti-correlated with the false negative rate of that model; and
  determine the performance status of the selected component as one of:
    a positive category when an average of the weighted positive scores of the models of the ensemble of related machine learning models is greater than a threshold value and an average of the weighted negative scores of the models of the ensemble of related machine learning models is less than or equal to the threshold value;
    a negative category when the average of the weighted positive scores is less than or equal to the threshold value and the average of the weighted negative scores is greater than the threshold value; or
    an unclassified category when both of the average of the weighted positive scores and the average of the weighted negative scores are greater than the threshold value or both are less than or equal to the threshold value.

13. The system of claim 12, wherein the models of the ensemble of related machine learning models are selected from a group of candidate models each having an ROC, wherein the models of the ensemble of related machine learning models are along a convex ROC hull of the group of candidate models.

14. The system of claim 12, wherein at least one model of the ensemble of related machine learning models is class biased.

15. The system of claim 12, wherein the positive score of each model indicates a likelihood of non-performance of the selected component and wherein the complementary negative score of each model indicates a likelihood of continued performance of the selected component.

16. The system of claim 12, wherein the weighted positive score is a product of the positive score of the respective model and an inverse exponential with an exponent proportional to the false positive rate of the respective model.

17. The system of claim 12, wherein the weighted negative score is a product of the negative score of the respective model and an inverse exponential with an exponent proportional to the false negative rate of the respective model.

18. The system of claim 12, further comprising a data link configured to communicate with a flight data storage system.

19. The system of claim 12, further comprising a display, wherein the display is configured to indicate the performance status with at least one of a visual, audio, or tactile display.

20. The system of claim 12, further comprising a sensor on board the aircraft, wherein the sensor is configured to collect flight data during the flight of the aircraft.

* * * * *